(12) United States Patent
Mikami et al.

(10) Patent No.: US 11,024,183 B2
(45) Date of Patent: Jun. 1, 2021

(54) AIR TRAFFIC CONTROL SUPPORT SYSTEM, AIR TRAFFIC CONTROL SUPPORT METHOD, AND RECORDING MEDIUM

(71) Applicant: NEC Corporation, Tokyo (JP)

(72) Inventors: Sawako Mikami, Tokyo (JP); Yousuke Motohashi, Tokyo (JP); Kazuhiko Awahara, Tokyo (JP); Akihito Kataoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 130 days.

(21) Appl. No.: 16/323,289

(22) PCT Filed: Aug. 1, 2017

(86) PCT No.: PCT/JP2017/027860
§ 371 (c)(1),
(2) Date: Feb. 5, 2019

(87) PCT Pub. No.: WO2018/034142
PCT Pub. Date: Feb. 22, 2018

(65) Prior Publication Data
US 2020/0193842 A1 Jun. 18, 2020

(30) Foreign Application Priority Data
Aug. 18, 2016 (JP) .............................. JP2016-160728

(51) Int. Cl.
*G06G 7/70* (2006.01)
*G08G 5/00* (2006.01)

(52) U.S. Cl.
CPC ........... *G08G 5/003* (2013.01); *G08G 5/0047* (2013.01)

(58) Field of Classification Search
CPC .............................. G08G 5/003; G08G 5/0047
See application file for complete search history.

(56) References Cited

U.S. PATENT DOCUMENTS

| | | | | |
|---|---|---|---|---|
| 2016/0093218 A1* | 3/2016 | Hale | .................... | G08G 5/0039 701/120 |
| 2020/0193842 A1* | 6/2020 | Mikami | ................ | G08G 5/003 |

FOREIGN PATENT DOCUMENTS

| | | |
|---|---|---|
| JP | 2801883 B2 | 9/1998 |
| JP | 2000-304551 A | 11/2000 |
| JP | 2003-296900 A | 10/2003 |
| JP | 2008-97454 A | 4/2008 |

(Continued)

OTHER PUBLICATIONS

Kageyama et al., "Information Systems in Air Traffic Control", Information Processing, Oct. 2012, vol. 53, No. 10, pp. 1060-1065 (total 6 pages).

(Continued)

*Primary Examiner* — Adam M Alharbi

(57) ABSTRACT

An air traffic control support system for more quickly grasping a flight plan in air traffic control is provided. An air traffic control support system 3 includes a learning unit 100 and a prediction unit 200. The learning unit 100 generates a prediction model, based on learning data including a past flight plan and information that affected formulation of the past flight plan. The prediction unit 200 predicts a flight plan, based on information that affects formulation of the flight plan and a prediction model.

6 Claims, 26 Drawing Sheets

(56) References Cited

FOREIGN PATENT DOCUMENTS

JP  2014-151912 A  8/2014

OTHER PUBLICATIONS

Fujimaki et al., "The Most Advanced Data Mining of the Big Data Era", NEC Technical Journal, vol. 7, No. 2, 2012, pp. 91-96 (total 8 pages).
Eto et al., "Fully-Automatic Bayesian Piecewise Sparse Linear Models", Proceedings of the 17th International Conference on Artificial Intelligence and Statistics (AISTATS), 2014, pp. 238-246 (total 9 pages).
International Search Report for PCT/JP2017/027860 dated Oct. 31, 2017 [PCT/ISA/210].
Written Opinion for PCT/JP2017/027860 dated Oct. 31, 2017 [PCT/ISA/210].

* cited by examiner

Fig.5

LEARNING DATA

FLIGHT ID=003

FLIGHT ID=002

FLIGHT ID=001

SCHEDULED DATE OF DEPARTURE: 2016/06/01

FLIGHT PLAN

| ROUTE | AB1 |
|---|---|
| SPEED | 480 kt |
| ALTITUDE | 30000 feet |

REFERENCE INFORMATION

| AIRLINE | Airline A |
|---|---|
| SCHEDULED TIME OF DEPARTURE | 08:30 |
| SCHEDULED DATE OF DEPARTURE | 2016/06/01 |
| SCHEDULED DAY OF WEEK OF DEPARTURE | WEDNESDAY |
| DEPARTURE AIRPORT | A |
| DESTINATION AIRPORT | B |
| AIRCRAFT TYPE | A111 |
| WAKE TURBULENCE CATEGORY (H/M/L) | H |
| WIND DIRECTION AT DEPARTURE AIRPORT | NORTH |
| WIND SPEED AT DEPARTURE AIRPORT | 1 kt |
| ATMOSPHERIC PRESSURE AT DEPARTURE AIRPORT | 1000 hPa |
| TEMPERATURE AT DEPARTURE AIRPORT | 10 °C |
| HUMIDITY AT DEPARTURE AIRPORT | 60% |
| ASCENDING CURRENT AT DEPARTURE AIRPORT | 10 |
| WIND DIRECTION AT DESTINATION AIRPORT | SOUTH |
| WIND SPEED AT DESTINATION AIRPORT | 5 kt |
| ATMOSPHERIC PRESSURE AT DESTINATION AIRPORT | 1010 hPa |
| TEMPERATURE AT DESTINATION AIRPORT | 20 °C |
| HUMIDITY AT DESTINATION AIRPORT | 40% |
| ASCENDING CURRENT AT DESTINATION AIRPORT | 20 |

Fig.6

LEARNING DATA

FLIGHT ID=001

SCHEDULED DATE OF DEPARTURE : 2016/06/01

FLIGHT PLAN

| ROUTE | AB1 |
|---|---|
| SPEED | 480 kt |
| ALTITUDE | 30000 feet |

REFERENCE INFORMATION

| SCHEDULED TIME OF DEPARTURE | 08:30 |
|---|---|
| SCHEDULED DATE OF DEPARTURE | 2016/06/01 |
| SCHEDULED DAY OF WEEK OF DEPARTURE | WEDNESDAY |
| DEPARTURE AIRPORT | A |
| DESTINATION AIRPORT | B |
| AIRCRAFT TYPE | A111 |
| WAKE TURBULENCE CATEGORY | H |
| WIND DIRECTION AT DEPARTURE AIRPORT | NORTH |
| WIND SPEED AT DEPARTURE AIRPORT | 1 kt |
| ATMOSPHERIC PRESSURE AT DEPARTURE AIRPORT | 1000 hPa |
| TEMPERATURE AT DEPARTURE AIRPORT | 10 °C |
| HUMIDITY AT DEPARTURE AIRPORT | 60% |
| ASCENDING CURRENT AT DEPARTURE AIRPORT | 10 |
| WIND DIRECTION AT DESTINATION AIRPORT | SOUTH |
| WIND SPEED AT DESTINATION AIRPORT | 5 kt |
| ATMOSPHERIC PRESSURE AT DESTINATION AIRPORT | 1010 hPa |
| TEMPERATURE AT DESTINATION AIRPORT | 20 °C |
| HUMIDITY AT DESTINATION AIRPORT | 40% |
| ASCENDING CURRENT AT DESTINATION AIRPORT | 20 |

LEARNING DATA (PREPROCESSED)

| OBJECTIVE VARIABLE | VALUE |
|---|---|
| Yr:ROUTE | AB1 |
| Yv:SPEED | 480 |
| Yh:ALTITUDE | 30000 |

| EXPLANATORY VARIABLE | VALUE |
|---|---|
| X1:AIRLINE IS AIRLINE A | 1 |
| X2:SCHEDULED TIME OF DEPARTURE | 8:30 |
| X3:SCHEDULED DATE OF DEPARTURE (THE NUMBER OF DAYS ELAPSED FROM 01/01) | 152 |
| X4:SCHEDULED DATE OF DEPARTURE IS ON SUNDAY | 0 |
| ⋮ | ⋮ |
| X7:AIRCRAFT TYPE IS A111 | 1 |
| X8:WAKE TURBULENCE CATEGORY IS H | 1 |
| X9:WAKE TURBULENCE CATEGORY IS M | 0 |
| ⋮ | ⋮ |
| X11:WIND DIRECTION AT DEPARTURE AIRPORT IS NORTH | 1 |
| X12:WIND SPEED AT DEPARTURE AIRPORT | 1 |
| X13:ATMOSPHERIC PRESSURE AT DEPARTURE AIRPORT | 1000 |
| X14:TEMPERATURE AT DEPARTURE AIRPORT | 10 |
| X15:HUMIDITY AT DEPARTURE AIRPORT | 60 |
| X16:ASCENDING CURRENT AT DEPARTURE AIRPORT | 10 |
| X17:WIND DIRECTION AT DESTINATION AIRPORT IS NORTH | 0 |
| X18:WIND SPEED AT DESTINATION AIRPORT | 5 |
| X19:ATMOSPHERIC PRESSURE AT DESTINATION AIRPORT | 1010 |
| X20:TEMPERATURE AT DESTINATION AIRPORT | 20 |
| X21:HUMIDITY AT DESTINATION AIRPORT | 40 |
| X22:ASCENDING CURRENT AT DESTINATION AIRPORT | 20 |

Fig.7

ROUTE PREDICTION MODEL (DEPARTURE AIRPORT A, DESTINATION AIRPORT B, AND ROUTE AB1)

PREDICTION EXPRESSION DETERMINING TREE

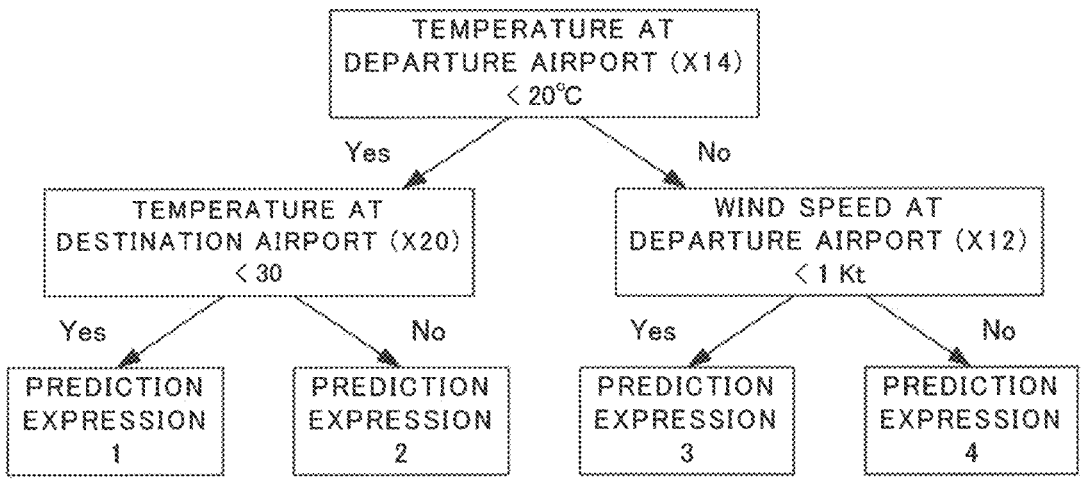

FORM OF EXPRESSION $Y_{rs}$(ROUTE DETERMINATION SCORE) =
  $A4 \cdot X4$ (SCHEDULED DATE OF DEPARTURE IS ON SUNDAY)
  $+ A8 \cdot X8$ (WAKE TURBULENCE CATEGORY IS H)
  $+ A9 \cdot X9$ (WAKE TURBULENCE CATEGORY IS M)
  $+ A12 \cdot X12$ (WIND SPEED AT DEPARTURE AIRPORT)
  $+ A22 \cdot X22$ (ASCENDING CURRENT AT DESTINATION AIRPORT)
  $+ B$ (BIAS)

WHEN $Y_{rs} < Y_{th}$, IT IS DETERMINED THAT $Y_r$ (ROUTE) = ROUTE AB1

WHEN $Y_{rs} \geq Y_{th}$, IT IS DETERMINED THAT $Y_r$ (ROUTE) $\neq$ ROUTE AB1

PARAMETER OF EXPRESSION

| PARAMETER | PREDICTION EXPRESSION 1 | PREDICTION EXPRESSION 2 | PREDICTION EXPRESSION 3 | PREDICTION EXPRESSION 4 |
|---|---|---|---|---|
| A4 | 7.7 | 0 | 0 | 0 |
| A8 | 8.9 | 0 | 2.2 | −2.79 |
| A9 | 0 | 12.8 | 0 | 0 |
| A12 | 0 | −12.5 | 0 | 0 |
| A22 | 1.05 | −11.2 | 0 | 0 |
| B | −28.0 | 29.0 | 4.31 | 4.57 |

Fig.8

SPEED PREDICTION MODEL (DEPARTURE AIRPORT A, DESTINATION AIRPORT B, AND ROUTE AB1)

PREDICTION EXPRESSION DETERMINING TREE

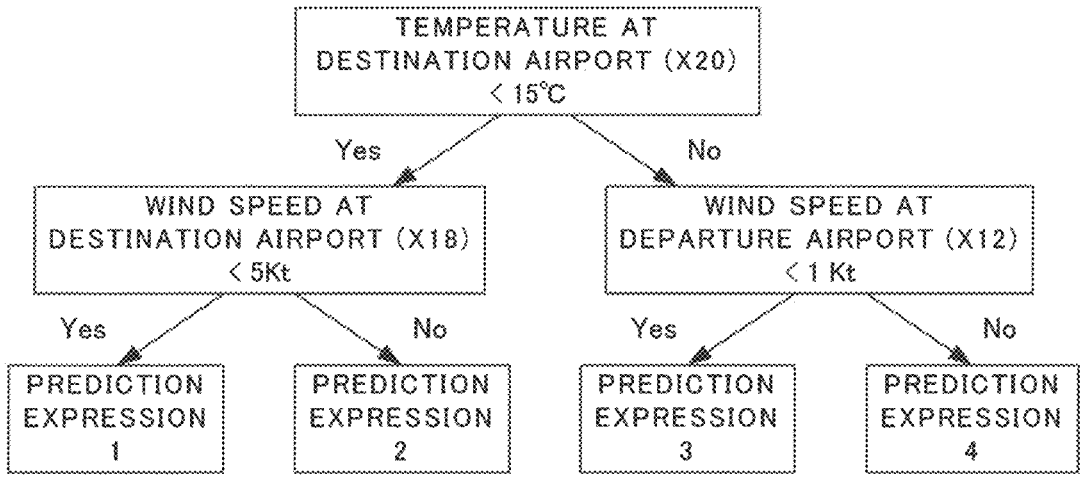

FORM OF EXPRESSION

Yv(SPEED)=
    A4 X4 (SCHEDULED DATE OF DEPARTURE IS ON SUNDAY)
    + A8·X8 (WAKE TURBULENCE CATEGORY IS H)
      + A12·X12 (WIND SPEED AT DEPARTURE AIRPORT)
      + A13·X13 (ATMOSPHERIC PRESSURE AT DEPARTURE AIRPORT)
      + A18 X18 (WIND SPEED AT DESTINATION AIRPORT) + B (BIAS)

PARAMETER OF EXPRESSION

| PARAMETER | PREDICTION EXPRESSION 1 | PREDICTION EXPRESSION 2 | PREDICTION EXPRESSION 3 | PREDICTION EXPRESSION 4 |
|---|---|---|---|---|
| A4 | ... | ... | ... | ... |
| A8 | ... | ... | ... | ... |
| A12 | ... | ... | ... | ... |
| A13 | ... | ... | ... | ... |
| A18 | ... | ... | ... | ... |
| B | ... | ... | ... | ... |

Fig.11

PREDICTION DATA

FLIGHT ID=003

FLIGHT ID=002

FLIGHT ID=001

SCHEDULED DATE OF DEPARTURE: 2016/06/19

REFERENCE INFORMATION

| AIRLINE | Airline A |
|---|---|
| SCHEDULED TIME OF DEPARTURE | 08:30 |
| SCHEDULED DATE OF DEPARTURE | 2016/06/19 |
| SCHEDULED DAY OF WEEK OF DEPARTURE | SUNDAY |
| DEPARTURE AIRPORT | A |
| DESTINATION AIRPORT | B |
| AIRCRAFT TYPE | A111 |
| WAKE TURBULENCE CATEGORY (H/M/L) | H |
| WIND DIRECTION AT DEPARTURE AIRPORT | SOUTH |
| WIND SPEED AT DEPARTURE AIRPORT | 2 kt |
| ATMOSPHERIC PRESSURE AT DEPARTURE AIRPORT | 1010 hPa |
| TEMPERATURE AT DEPARTURE AIRPORT | 15 °C |
| HUMIDITY AT DEPARTURE AIRPORT | 50% |
| ASCENDING CURRENT AT DEPARTURE AIRPORT | 15 |
| WIND DIRECTION AT DESTINATION AIRPORT | EAST |
| WIND SPEED AT DESTINATION AIRPORT | 5 kt |
| ATMOSPHERIC PRESSURE AT DESTINATION AIRPORT | 990 hPa |
| TEMPERATURE AT DESTINATION AIRPORT | 25 °C |
| HUMIDITY AT DESTINATION AIRPORT | 60% |
| ASCENDING CURRENT AT DESTINATION AIRPORT | 10 |

Fig.12

PREDICTION DATA

FLIGHT ID=001

SCHEDULED DATE OF DEPARTURE: 2016/06/19

REFERENCE INFORMATION

| | |
|---|---|
| AIRLINE | Airline A |
| SCHEDULED TIME OF DEPARTURE | 8:30 |
| SCHEDULED DATE OF DEPARTURE | 2016/06/19 |
| SCHEDULED DAY OF WEEK OF DEPARTURE | SUNDAY |
| DEPARTURE AIRPORT | A |
| DESTINATION AIRPORT | B |
| AIRCRAFT TYPE | A111 |
| WAKE TURBULENCE CATEGORY | H |
| WIND DIRECTION AT DEPARTURE AIRPORT | SOUTH |
| WIND SPEED AT DEPARTURE AIRPORT | 2 kt |
| ATMOSPHERIC PRESSURE AT DEPARTURE AIRPORT | 1010 hPa |
| TEMPERATURE AT DEPARTURE AIRPORT | 15 °C |
| HUMIDITY AT DEPARTURE AIRPORT | 50% |
| ASCENDING CURRENT AT DEPARTURE AIRPORT | 15 |
| WIND DIRECTION AT DESTINATION AIRPORT | EAST |
| WIND SPEED AT DESTINATION AIRPORT | 5 kt |
| ATMOSPHERIC PRESSURE AT DESTINATION AIRPORT | 990 hPa |
| TEMPERATURE AT DESTINATION AIRPORT | 25 °C |
| HUMIDITY AT DESTINATION AIRPORT | 60% |
| ASCENDING CURRENT AT DESTINATION AIRPORT | 10 |

PREDICTION DATA (PREPROCESSED)

| EXPLANATORY VARIABLE | VALUE |
|---|---|
| X1:AIRLINE IS AIRLINE A | 1 |
| X2:SCHEDULED TIME OF DEPARTURE | 8:30 |
| X3:SCHEDULED DATE OF DEPARTURE (THE NUMBER OF DAYS ELAPSED FROM 01/01) | 170 |
| X4:SCHEDULED DATE OF DEPARTURE IS ON SUNDAY | 1 |
| ⋮ | ⋮ |
| X7:AIRCRAFT TYPE IS A111 | 1 |
| X8:WAKE TURBULENCE CATEGORY IS H | 1 |
| X9:WAKE TURBULENCE CATEGORY IS M | 0 |
| ⋮ | ⋮ |
| X11:WIND DIRECTION AT DEPARTURE AIRPORT IS NORTH | 0 |
| X12:WIND SPEED AT DEPARTURE AIRPORT | 2 |
| X13:ATMOSPHERIC PRESSURE AT DEPARTURE AIRPORT | 1010 |
| X14:TEMPERATURE AT DEPARTURE AIRPORT | 15 |
| X15:HUMIDITY AT DEPARTURE AIRPORT | 50 |
| X16:ASCENDING CURRENT AT DEPARTURE AIRPORT | 15 |
| X17:WIND DIRECTION AT DESTINATION AIRPORT IS NORTH | 0 |
| X18:WIND SPEED AT DESTINATION AIRPORT | 5 |
| X19:ATMOSPHERIC PRESSURE AT DESTINATION AIRPORT | 990 |
| X20:TEMPERATURE AT DESTINATION AIRPORT | 25 |
| X21:HUMIDITY AT DESTINATION AIRPORT | 60 |
| X22:ASCENDING CURRENT AT DESTINATION AIRPORT | 10 |

ROUTE PREDICTION EXAMPLE (FLIGHT ID = 001)

PREDICTION EXPRESSION DETERMINING TREE

PARAMETER OF EXPRESSION

| PARAMETER | PREDICTION EXPRESSION 1 |
|---|---|
| A4 | 7.7 |
| A8 | 8.9 |
| A9 | 0 |
| A12 | 0 |
| A22 | 1.05 |
| B | −28.0 |

ROUTE DETERMINATION SCORE CALCULATION $Yrs = A4(7.7) \cdot X4(1) + A8(8.9) \cdot X8(1) + A9(0) \cdot X9(0) + A12(0) \cdot X12(2)$
$\qquad + A22(1.05) \cdot X22(10) + B(-28.0) = -0.9$ WHEN Yth IS 0

$\qquad$ Yrs < Yth → IT IS DETERMINED THAT Yr (ROUTE) = ROUTE AB1

Fig.25

FLIGHT INFORMATION SCREEN

FLIGHT INFORMATION ABOUT AIRSPACE T03 ON 2016/06/19 09:00

| FLIGHT ID | SCHEDULE | | | | PREDICTED FLIGHT PLAN | | |
|---|---|---|---|---|---|---|---|
| | DEPARTURE AIRPORT | DEPARTURE TIME | DESTINATION AIRPORT | ARRIVAL TIME | ROUTE | SPEED | ALTITUDE |
| 001 | A | 08:30 | B | 10:20 | AB1 | 480kt | 36000ft |
| 002 | C | 08:00 | D | 10:10 | CD2 | 490kt | 34000ft |
| 003 | A | 08:35 | E | 10:00 | AE1 | 470kt | 32000ft |
| ... | ... | ... | ... | ... | ... | ... | ... |

PREDICTION EVIDENCE OF FLIGHT ID [▼]  (DISPLAY)

PREDICTION EVIDENCE STATISTIC (TIME ZONE)  (DISPLAY)

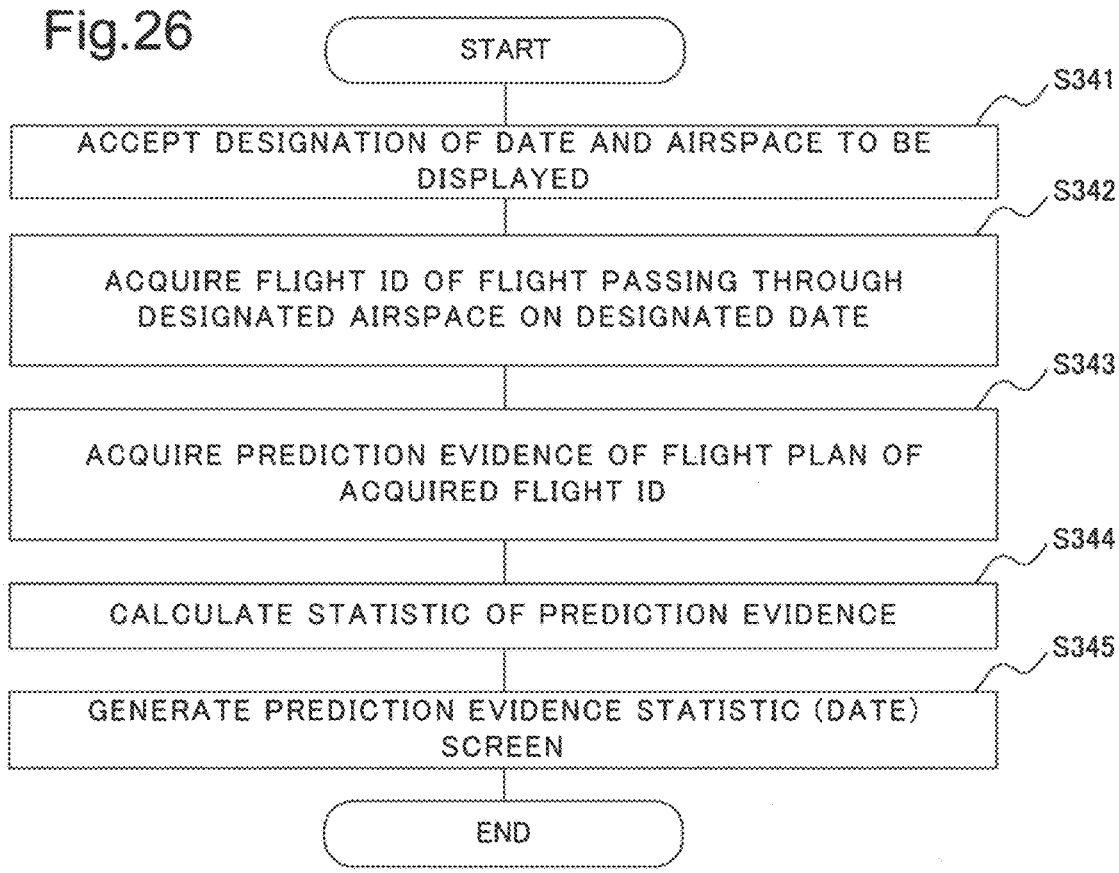

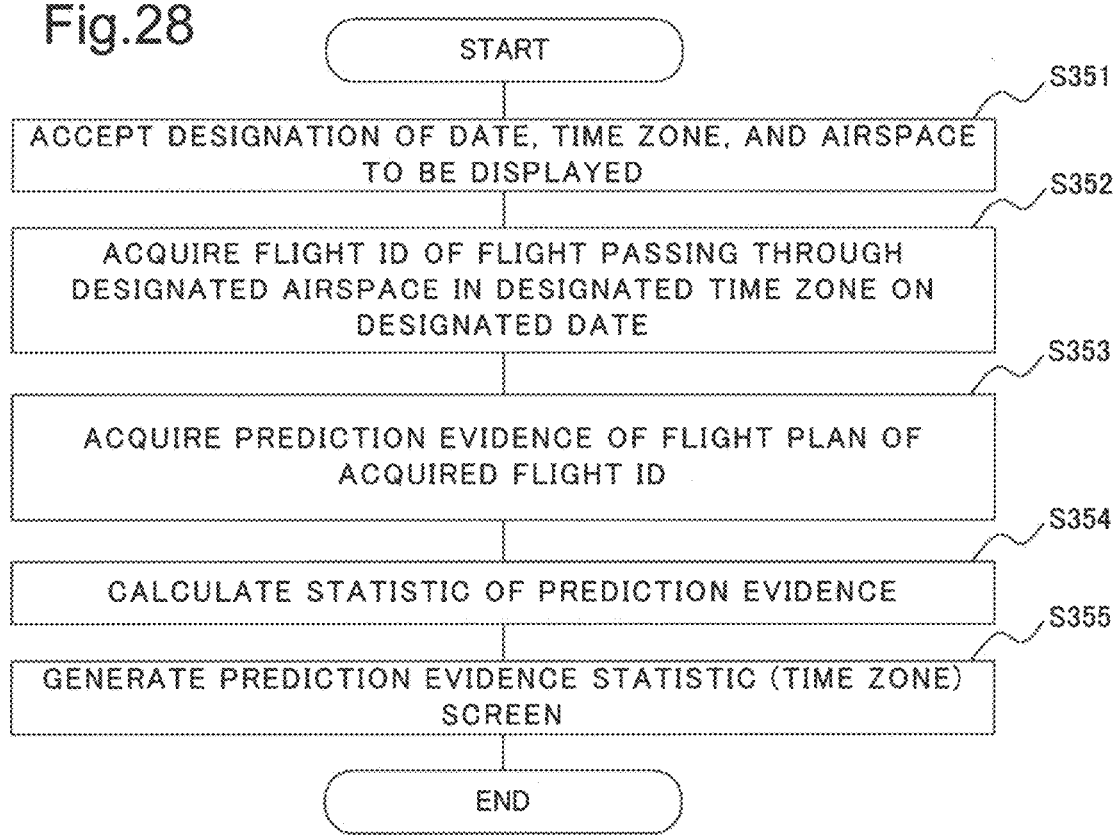

Fig.30

```
START
  ↓
ACCEPT DESIGNATION OF FLIGHT ID                    — S361
  ↓
ACQUIRE PREDICTION EVIDENCE OF FLIGHT PLAN OF      — S362
DESIGNATED FLIGHT ID
  ↓
GENERATE PREDICTION EVIDENCE DISPLAY SCREEN        — S363
  ↓
END
```

Fig.31

PREDICTION EVIDENCE SCREEN

PREDICTION EVIDENCE OF FLIGHT ID 001 IN AIRSPACE T03 ON 2016/06/19 9:00

| PREDICTED FLIGHT PLAN | | |
|---|---|---|
| ROUTE | SPEED | ALTITUDE |
| AB1 | 480kt | 36000ft |

| ATTRIBUTE | DEGREE OF CONTRIBUTION | EXPLANATORY VARIABLE | COEFFICIENT |
|---|---|---|---|
| SCHEDULED DATE OF DEPARTURE IS ON SUNDAY | 7.7 | X4=1 | A4=7.7 |
| WAKE TURBULENCE CATEGORY IS H | 8.9 | X8=1 | A8=8.9 |
| WAKE TURBULENCE CATEGORY IS M | 0 | X9=0 | A9=0 |
| WIND SPEED AT DEPARTURE AIRPORT | 0 | X12=2 | A12=0 |
| ASCENDING CURRENT AT DESTINATION AIRPORT | 10.5 | X22=10 | A22=1.05 |
| ⋮ | ⋮ | ⋮ | ⋮ |

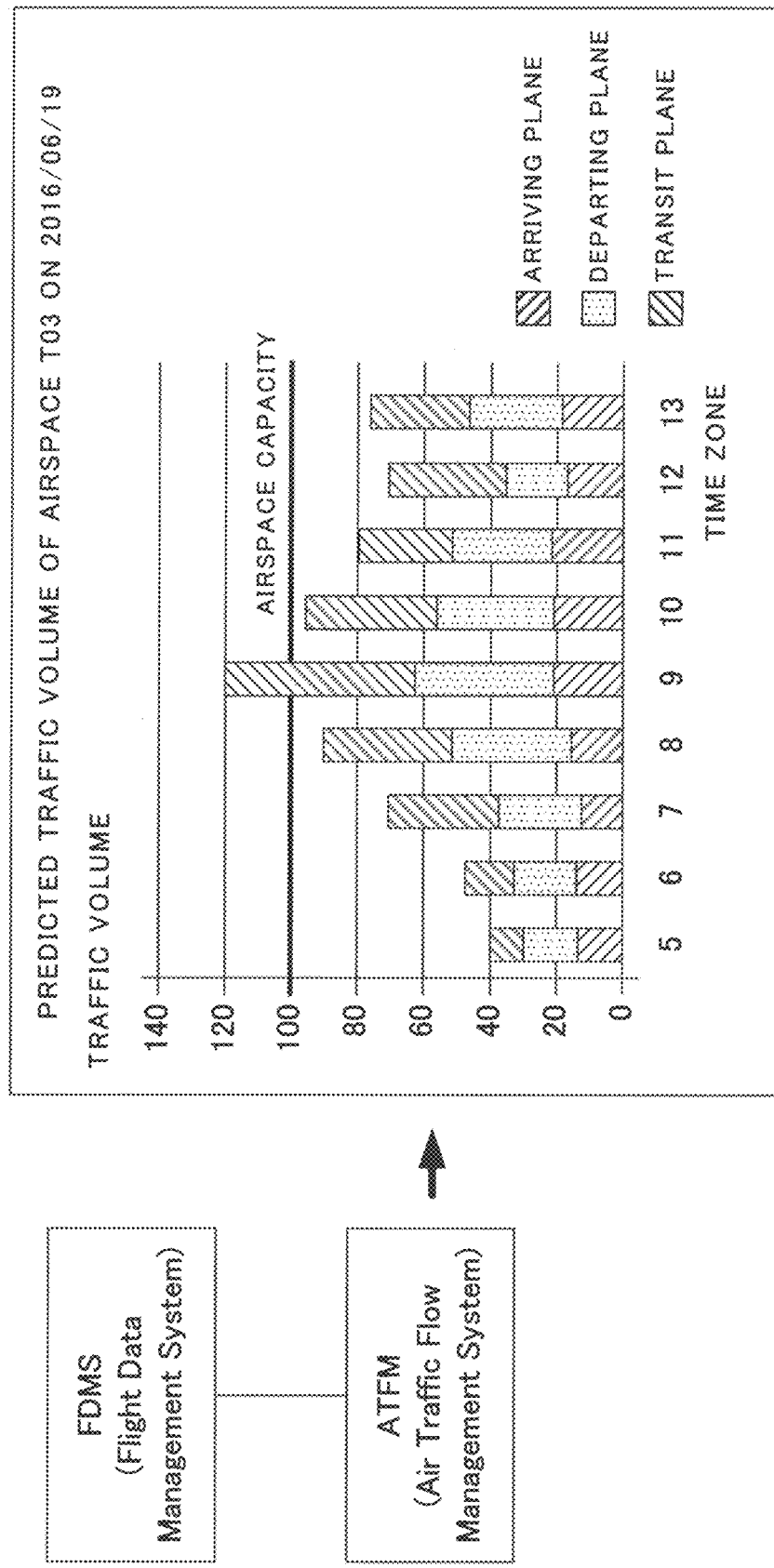

AIR TRAFFIC CONTROL SUPPORT SYSTEM, AIR TRAFFIC CONTROL SUPPORT METHOD, AND RECORDING MEDIUM

This application is a National Stage Entry of PCT/JP2017/027860 filed on Aug. 1, 2017, which claims priority from Japanese Patent Application 2016-160728 filed on Aug. 18, 2016, the contents of all of which are incorporated herein by reference, in their entirety.

TECHNICAL FIELD

The present invention relates to an air traffic control support system, an air traffic control support method, and a recording medium.

BACKGROUND ART

A control information processing system for providing information needed for monitoring, determination, and control instructions, for an air traffic management controller who performs traffic flow management and a controller who performs air traffic control (hereinafter also collectively described as a controller and the like) is used in air traffic control. NPL 1 discloses one example of such a control information processing system. FIG. 32 is a diagram illustrating a part of a configuration of a control information processing system in NPL 1. The control information processing system includes a flight data management system (FDMS) and an air traffic flow management system (ATFM).

A flight plan of each flight (operating flight) presented from each airline is accumulated in the FDMS. For example, an instructed speed, an instructed altitude, and an instructed route in a flight are described in the flight plan. Each airline formulates a flight plan, based on a schedule of each flight and a weather forecast, and presents the flight plan by a predetermined time before an actual flight.

The ATFM calculates a prediction value of a traffic volume in each airspace, based on a flight plan of each flight accumulated in the FDMS, and displays the prediction value in a graph. The graph displays, for example, prediction values of a traffic volume classified into an arriving plane to an airspace, a departing plane from the airspace, and a transit plane through the airspace for each time zone, together with an airspace capacity. When it is determined that a prediction value of the traffic volume exceeds the airspace capacity, based on the displayed graph, an air traffic management controller performs traffic flow control, such as delaying a flight.

Note that, as a related technique of a control information processing system, PTL 1 discloses a system for predicting an aircraft to be controlled, based on a flight plan, and determining a terminal for controlling the aircraft to be controlled. Further, PTL 2 discloses a technique for calculating a traffic volume, based on a flight plan, and generating a change route plan when the traffic volume exceeds a control capacity. Further, as the other related techniques, NPLs 2 and 3 disclose a heterogeneous mixture learning technique for generating a prediction model for each group having the same pattern and regularity of data.

CITATION LIST

Patent Literature

[PTL 1] Japanese Patent No. 2801883
[PTL 2] Japanese Patent Application Laid-Open Publication No. 2003-296900

Non Patent Literature

[NPL 1] Kota KAGEYAMA, Hisae AOYAMA, "Information Systems in Air Traffic Control", Information Processing, Vol. 53, No. 10, 2012, pp. 1060 to 1065
[NPL 2] Ryohei FUJIMAKI, Satoshi MORINAGA, "The Most Advanced Data Mining of the Big Data Era", NEC Technical Journal, Vol. 65, No. 2, 2012, pp. 81 to 85
[NPL 3] Riki Eto, et al., "Fully-Automatic Bayesian Piecewise Sparse Linear Models", Proceedings of the 17th International Conference on Artificial Intelligence and Statistics (AISTATS), 2014, pp. 238 to 246

SUMMARY OF INVENTION

Technical Problem

It is expected that a traffic volume in each airspace will be further increased due to an increasing demand for aviation in the future. Thus, a frequency of traffic flow control increases, and an increase in delay time of a flight and an increase in load on a controller and the like are expected. Therefore, it is desired that a frequency of traffic flow control is reduced by more quickly grasping a flight plan presented from each airline and more quickly executing traffic flow control. However, PTLs 1, 2 and NPL 1 mentioned above do not disclose a technique for more quickly grasping a flight plan.

An example object of the present invention is to provide an air traffic control support system, an air traffic control support method, and a recording medium that are capable of solving the above-mentioned problem and more quickly grasping a flight plan in air traffic control.

Solution to Problem

An air traffic control support system according to an exemplary aspect of the present invention includes: learning means configured to generate a prediction model, based on learning data including a past flight plan and information that affected formulation of the past flight plan; and prediction means configured to predict a flight plan, based on information affecting formulation of the flight plan and the prediction model.

An air traffic control support method according to an exemplary aspect of the present invention includes: generating a prediction model, based on learning data including a past flight plan and information that affected formulation of the past flight plan; and predicting a flight plan, based on information affecting formulation of the flight plan and the prediction model.

A computer readable recording medium according to an exemplary aspect of the present invention records thereon a program causing a computer to perform a method including: generating a prediction model, based on learning data including a past flight plan and information that affected formulation of the past flight plan; and predicting a flight plan, based on information affecting formulation of the flight plan and the prediction model.

Advantageous Effects of Invention

An advantageous effect of the present invention is to be able to more quickly grasp a flight plan in air traffic control.

BRIEF DESCRIPTION OF DRAWINGS

FIG. 5 is a diagram illustrating an example of learning data stored in a learning data storage unit 601 in the example embodiment.

FIG. 6 is a diagram illustrating an example of preprocessing on learning data in the example embodiment.

FIG. 7 is a diagram illustrating an example of a prediction model in the example embodiment.

FIG. 8 is a diagram illustrating another example of a prediction model in the example embodiment.

FIG. 11 is a diagram illustrating an example of prediction data stored in a prediction data storage unit 602 in the example embodiment.

FIG. 12 is a diagram illustrating an example of preprocessing on prediction data in the example embodiment.

FIG. 25 is a diagram illustrating an example of a flight information screen in the example embodiment.

FIG. 26 is a flowchart illustrating processing of displaying a prediction evidence statistic (date) screen in the example embodiment.

FIG. 27 is a diagram illustrating an example of a prediction evidence statistic (date) screen in the example embodiment.

FIG. 28 is a flowchart illustrating processing of displaying a prediction evidence statistic (time zone) screen in the example embodiment.

FIG. 29 is a diagram illustrating an example of a prediction evidence statistic (time zone) screen in the example embodiment.

FIG. 30 is a flowchart illustrating processing of displaying a prediction evidence screen in the example embodiment.

FIG. 31 is a diagram illustrating an example of a prediction evidence screen in the example embodiment.

FIG. 32 is a diagram illustrating a part of a configuration of a control information processing system in NPL 1.

EXAMPLE EMBODIMENT

First, a flight plan in an example embodiment is described. For air traffic, each airline formulates a flight plan and presents the flight plan before a predetermined period of time of an actual flight. The flight plan includes information about a route, a speed, an altitude, and the like of an aircraft in a flight. Herein, the route represents airspace passed between a departure airport and a destination airport. A plurality of routes are set for a combination of a departure airport and a destination airport. In the flight plan, any of the plurality of routes is designated. An aircraft flies according to a presented flight plan. An airline refers to a schedule of a predetermined flight, a weather forecast acquired when a flight plan is formulated, and the like, and decides appropriate route, speed, altitude, and the like for an aircraft to fly safely. Hereinafter, information referred (used) when a flight plan is formulated, such as the schedule and the weather forecast, is also described as "reference information". The reference information is information that affects formulation of a flight plan.

Figure 2:
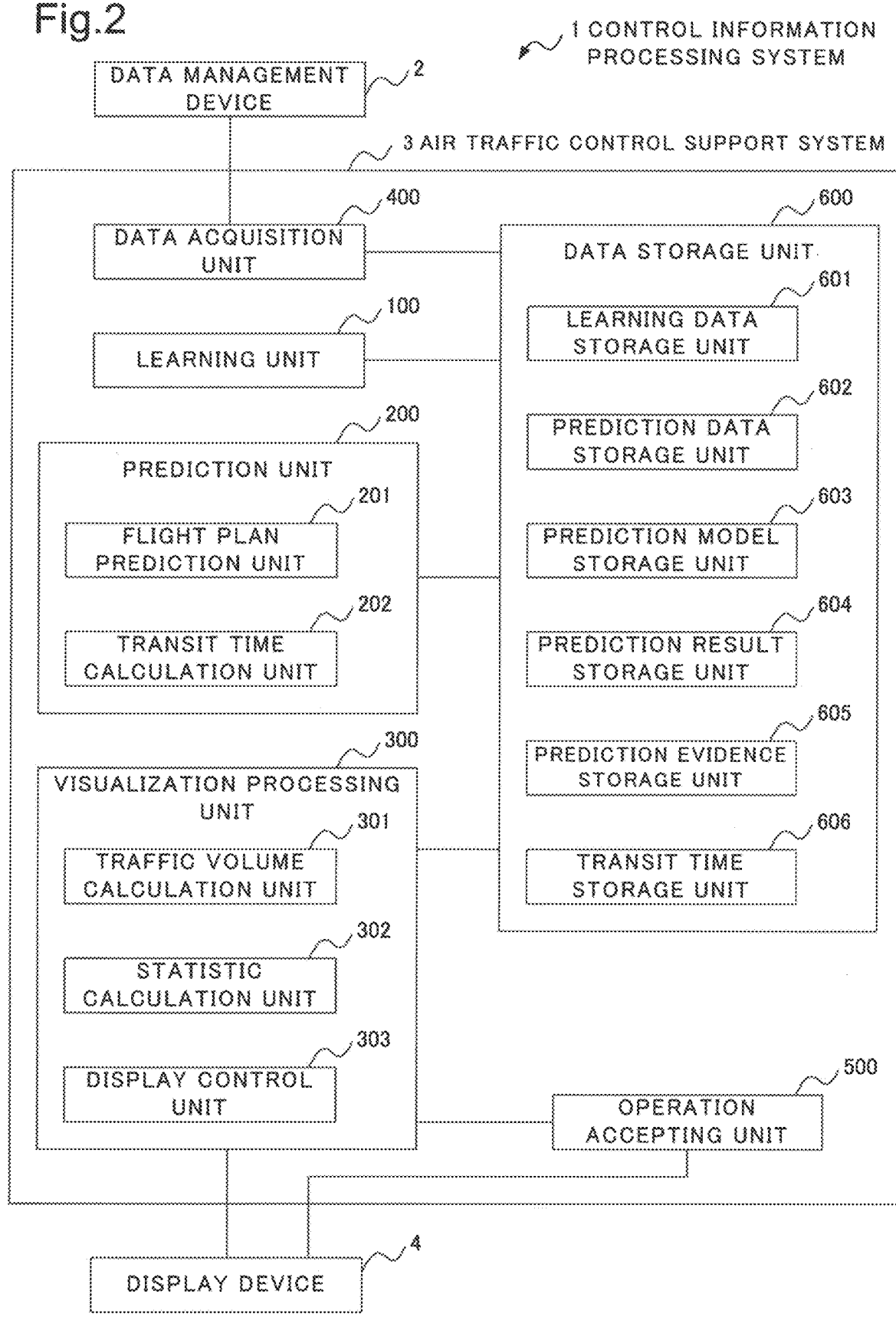
FIG. 2 is a block diagram illustrating a configuration of the example embodiment.

Next, a configuration of the example embodiment is described. FIG. 2 is a block diagram illustrating a configuration of the example embodiment. With reference to FIG. 2, a control information processing system 1 in the example embodiment includes a data management device 2, an air traffic control support system 3, and a display device 4. The data management device 2 and the air traffic control support system 3 are connected to each other with a network and the like. Further, the air traffic control support system 3 and the display device 4 are also connected to each other with a network and the like.

The data management device 2 may be a part of the above-mentioned FDMS. The air traffic control support system 3 and the display device 4 may be a part of the above-mentioned ATFM.

The data management device 2 stores a flight plan presented from an airline, reference information when the flight plan is formulated, and the like.

The air traffic control support system 3 predicts a flight plan to be presented from an airline, and predicts an air traffic volume, based on the predicted flight plan. The air traffic control support system 3 includes a learning unit 100, a prediction unit 200, a visualization processing unit 300, a data acquisition unit 400, an operation accepting unit 500, and a data storage unit 600.

The learning unit 100 generates a prediction model for predicting a flight plan to be presented for each flight, based on learning data. The learning data includes a flight plan presented from an airline for a past flight (past flight plan) and reference information for the past flight plan (information referred when the past flight plan is formulated). The learning unit 100 generates a prediction model by using a machine learning technique. For example, the heterogeneous mixture learning technique disclosed in NPLs 2 and 3 is used as the machine learning technique. Note that, other machine learning techniques, such as a decision tree and linear regression, may be used as long as a prediction model for predicting a flight plan can be generated, based on learning data.

The prediction unit 200 includes a flight plan prediction unit 201 and a transit time calculation unit 202.

The flight plan prediction unit 201 predicts a flight plan to be presented for each flight, based on prediction data and a prediction model. The prediction data includes reference information for the flight plan to be predicted (information that needs to be referred when the flight plan to be predicted is formulated). Hereinafter, a flight plan that is predicted is also described as a predicted flight plan.

The transit time calculation unit 202 calculates a prediction time at which an aircraft associated with each flight passes through each airspace on a route, based on the predicted flight plan. Hereinafter, a transit time that is predicted is also described as a predicted transit time.

The visualization processing unit 300 includes a traffic volume calculation unit 301, a statistic calculation unit 302, and a display control unit 303.

The traffic volume calculation unit 301 calculates a prediction value of an air traffic volume planned for each time zone and each airspace, based on the predicted flight plan. Hereinafter, an air traffic volume that is predicted is also described as a predicted traffic volume.

The statistic calculation unit 302 calculates a predetermined statistic concerned with a degree of contribution (or also described as a degree of an influence) of the reference information. The degree of contribution represents a degree that each attribute in the reference information used as an explanatory variable of a prediction model contributes (affects) a prediction result in prediction of a flight plan.

The display control unit 303 causes the display device 4 to display the predicted flight plan and the predicted traffic volume. The display control unit 303 may cause the display device 4 to display the degree of contribution of each attribute in the reference information and a statistic of the degree of contribution together with the predicted flight plan and the predicted traffic volume.

The data acquisition unit 400 acquires learning data and prediction data from the data management device 2.

The operation accepting unit 500 accepts an operation concerned with display of a predicted traffic volume and a statistic of a degree of contribution from a user being a controller and the like.

The data storage unit 600 includes a learning data storage unit 601, a prediction data storage unit 602, a prediction model storage unit 603, a prediction result storage unit 604, a prediction evidence storage unit 605, and a transit time storage unit 606.

The learning data storage unit 601 stores the learning data acquired by the data acquisition unit 400.

The prediction data storage unit 602 stores the prediction data acquired by the data acquisition unit 400.

The prediction model storage unit 603 stores the prediction model generated by the learning unit 100.

The prediction result storage unit 604 stores the predicted flight plan predicted by the flight plan prediction unit 201.

The prediction evidence storage unit 605 stores, as a prediction evidence, the degree of contribution of each attribute in the reference information calculated in prediction by the flight plan prediction unit 201.

The transit time storage unit 606 stores the predicted transit time of each flight in each airspace calculated by the transit time calculation unit 202.

The display device 4 displays the predicted flight plan and the predicted traffic volume according to control by the display control unit 303.

Note that, the air traffic control support system 3 may be a computer including a central processing unit (CPU) and a recording medium that stores a program, and operating by control based on the program.

Figure 3:
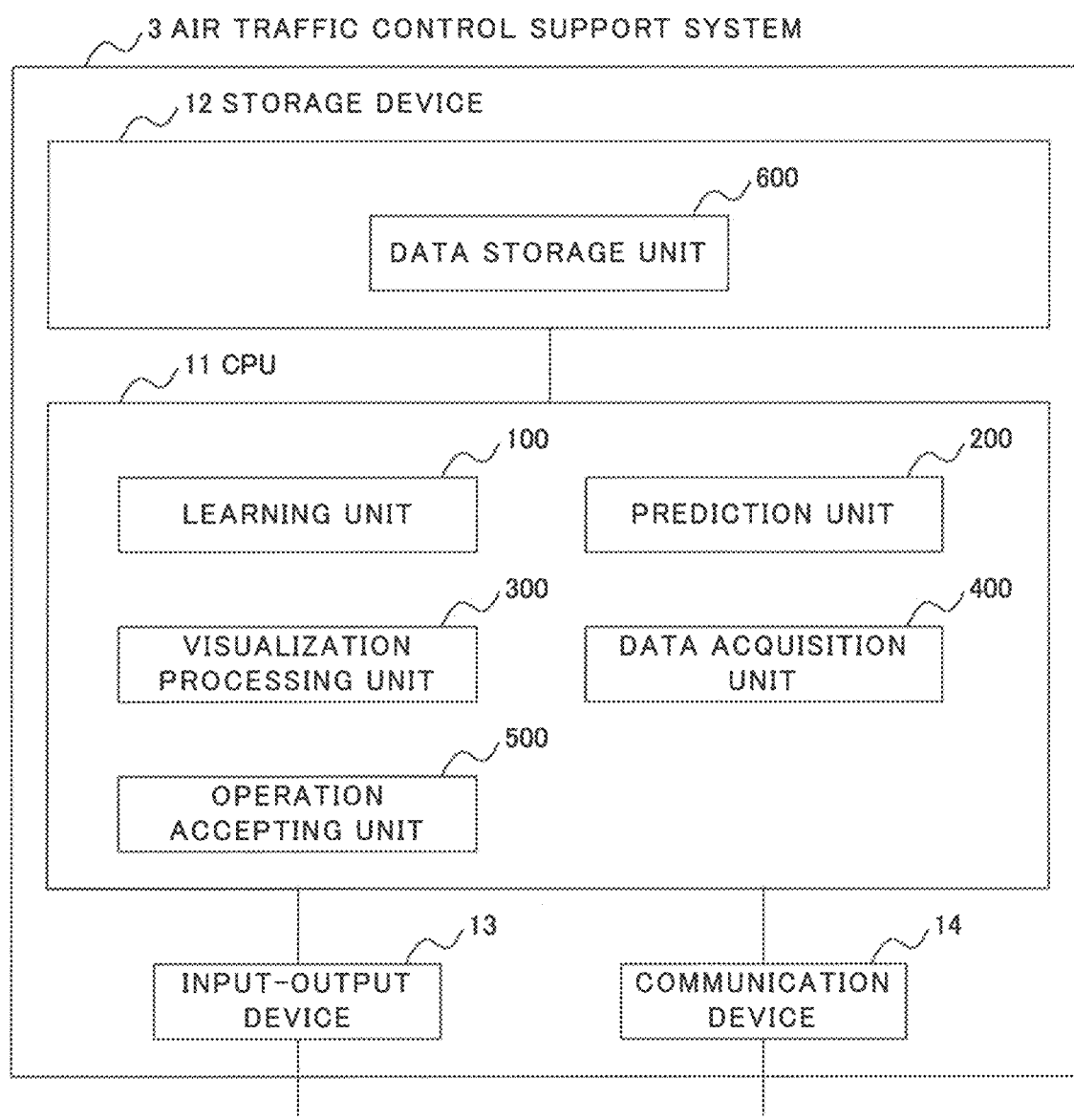
FIG. 3 is a block diagram illustrating a configuration of an air traffic control support system 3 implemented on a computer in the example embodiment.

FIG. 3 is a block diagram illustrating a configuration of the air traffic control support system 3 implemented on a computer in the example embodiment.

In this case, the air traffic control support system 3 includes a CPU 11, a storage device 12 (recording medium) such as a hard disk and a memory, an input-output device 13, and a communication device 14. The CPU 11 executes programs for implementing the learning unit 100, the prediction unit 200, the visualization processing unit 300, the data acquisition unit 400, and the operation accepting unit 500. The storage device 12 stores these programs and data of the data storage unit 600. The input-output device 13 outputs display information to the display device 4 and inputs operation information for a display result from the display device 4. The communication device 14 receives learning data and prediction data from the data management device 2 via a network. The communication device 14 may transmit display information to the display device 4 and receive operation information from the display device 4. Further, the input-output device 13 may receive learning data and prediction data from a user.

A part or the whole of respective components of the air traffic control support system 3 may be implemented on a general-purpose or dedicated piece of circuitry, processor, and a combination thereof. The piece of circuitry and the processor may be formed by a single chip or formed by a plurality of chips connected to one another via a bus. Further, a part or the whole of respective components of the air traffic control support system 3 may be implemented on a combination of the above-mentioned circuitry and the like and a program.

When a part or the whole of respective components of the air traffic control support system 3 is implemented on a plurality of information processing devices, pieces of circuitry, and the like, the plurality of information processing devices, pieces of circuitry, and the like may be arranged in a concentrated manner or a distributed manner. For example, the information processing devices, pieces of circuitry, and the like may be implemented as a form in which each is connected via a communication network, such as a client server system or a cloud computing system.

Next, operation in the example embodiment is described.
<<Learning Processing>>

First, processing of generating a prediction model based on learning data (learning processing), is described.

FIG. 5 is a diagram illustrating an example of learning data stored in the learning data storage unit 601 in the example embodiment. As illustrated in FIG. 5, a set of a past flight plan and reference information for the past flight plan is stored for each flight identifier (ID) for a predetermined number of days in the learning data.

In the flight plan, an attribute value is set for each of attributes "route", "speed", and "altitude". Further, in the reference information, an attribute value is set for each of attributes "airline", "scheduled time of departure", . . . , and "ascending current at destination airport". An attribute value of each of the attributes in the reference information is set based on a schedule of a flight and a weather forecast when the flight plan is formulated. For example, "airline", "scheduled time of departure", "departure airport", "destination airport", and the like are set based on a schedule of a flight. Further, "wind direction at departure/destination airport", "wind speed at departure/destination airport", "atmospheric pressure at departure/destination airport", "temperature at departure/destination airport", and the like are set based on a weather forecast when the flight plan is formulated.

It is assumed herein that the learning data as illustrated in FIG. 5 is previously acquired by the data acquisition unit 400 and stored in the learning data storage unit 601.

Figure 4:
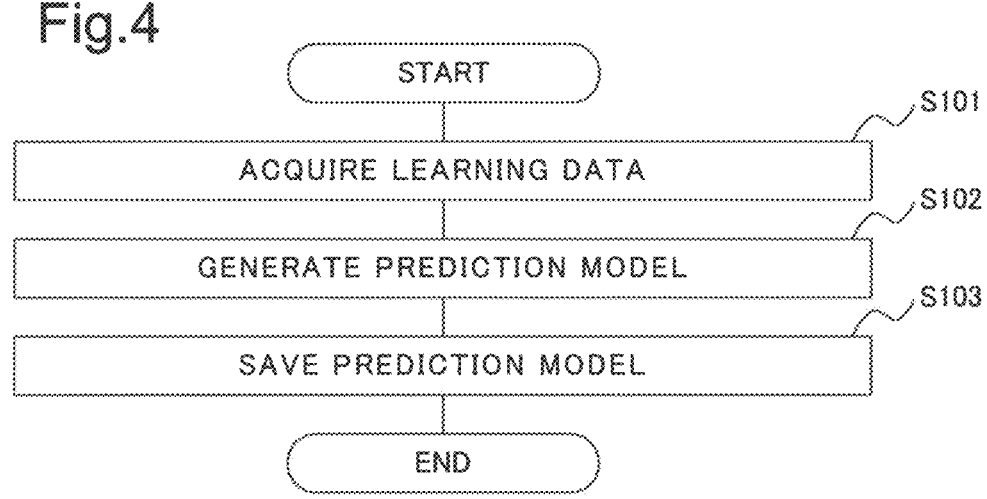
FIG. 4 is a flowchart illustrating learning processing in the example embodiment.

FIG. 4 is a flowchart illustrating the learning processing in the example embodiment.

The learning unit 100 acquires learning data from the learning data storage unit 601 (Step S101).

For example, the learning unit 100 acquires the learning data illustrated in FIG. 5.

The learning unit 100 generates a prediction model for predicting a flight plan, based on the acquired learning data (Step S102).

Herein, the learning unit 100 generates the prediction model by performing machine learning, using each attribute in the flight plan included in the learning data as an objective variable and each attribute in the reference information as an explanatory variable. Further, the learning unit 100 may perform predetermined preprocessing on learning data and generate a prediction model by using the preprocessed learning data. In the preprocessing, for example, an attribute needed for learning is selected, and processing and conversion are performed on an attribute value.

FIG. 6 is a diagram illustrating an example of preprocessing on learning data in the example embodiment. In the example of FIG. 6, selection of an attribute needed as an explanatory variable of a prediction model and conversion of an attribute value are performed on the learning data. Note that, as the preprocessing, a new attribute such as "maximum value of humidity over Japan" may be further generated, based on attributes at a plurality of places.

Herein, a prediction model of a flight plan (route, speed, and altitude) is generated for, for example, each route for each combination of a departure airport and a destination airport, based on learning data about a flight that flies on the route. Note that, a prediction model may be further generated for each time zone and time of a year (season and month).

FIGS. 7 and 8 are diagrams each illustrating an example of a prediction model in the example embodiment. FIGS. 7 and 8 are examples of prediction models for respectively predicting a route and a speed included in a flight plan when the heterogeneous mixture learning technique disclosed in NPLs 2 and 3 is used as machine learning. Further, FIGS. 7 and 8 are respectively a route prediction model and a speed prediction model for a departure airport A, a destination airport B, and a route AB1.

With reference to FIG. 7, the route prediction model includes a prediction expression determining tree, a form of a prediction expression, and a parameter of each prediction expression. Herein, the tree is used for determining a prediction expression, based on an attribute value in the reference information. In the prediction expression of the route prediction model, each attribute in the reference information is used as an explanatory variable $X_i$ (i is an integer of 1, ..., and N, and N is the number of explanatory variables), and a score $Y_{rs}$ for route determination is used as an objective variable. In each prediction expression, a coefficient $A_i$ multiplying the explanatory variable $X_i$ and a constant (bias) B are used as parameters. Whether or not a flight flies on a route associated with a route prediction model is determined by comparing a value of the score $Y_{rs}$ calculated from a prediction expression with a predetermined threshold value $Y_{th}$.

With reference to FIG. 8, the speed prediction model includes a prediction expression determining tree, a form of a prediction expression, and a parameter of each prediction expression, similarly to the route prediction model. In the prediction expression of the speed prediction model, each attribute in the reference information is used as an explanatory variable $X_i$, and a speed $Y_v$ is used as an objective variable. Note that, an altitude prediction model, which is not illustrated, also includes a tree, a form of a prediction expression, and a parameter of each prediction expression, similarly to the speed prediction model. In the prediction expression, an altitude $Y_h$ is used as an objective variable.

For example, the learning unit 100 generates a prediction model like FIGS. 7 and 8 for the departure airport A, the destination airport B, and the route AB1.

The learning unit 100 saves the generated prediction model in the prediction model storage unit 603 (Step S103).

Figure 9:
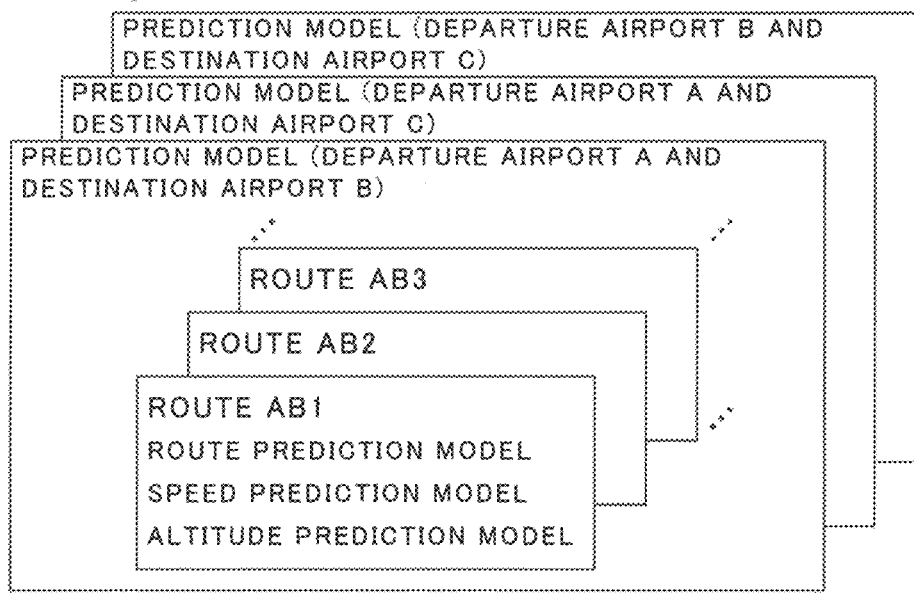
FIG. 9 is a diagram illustrating an example of a prediction model stored in a prediction model storage unit 603 in the example embodiment.

FIG. 9 is a diagram illustrating an example of a prediction model stored in the prediction model storage unit 603 in the example embodiment.

For example, as in FIG. 9, the learning unit 100 saves a generated prediction model for each route of each combination of a departure airport and a destination airport.

<<Prediction Processing>>

Next, processing of predicting a flight plan (prediction processing) is described.

FIG. 11 is a diagram illustrating an example of prediction data stored in the prediction data storage unit 602 in the example embodiment. As illustrated in FIG. 11, reference information for a flight for which a flight plan is to be predicted is stored for each combination of a flight ID and a scheduled date of departure in the prediction data. The flight to be predicted is a flight that may pass through an airspace at a data and time targeted for calculating a predicted traffic volume. For example, all flights that arrive at and depart from each airport within a day or a few days are used as the flight to be predicted.

An attribute value of each attribute is set in the reference information, similarly to the learning data. An attribute value of each of the attributes in the reference information is determined based on a schedule of a flight and a weather forecast at a time when prediction of the flight plan is executed.

It is assumed herein that the prediction data as illustrated in FIG. 11 is previously acquired by the data acquisition unit 400 and stored in the prediction data storage unit 602.

Figure 10:
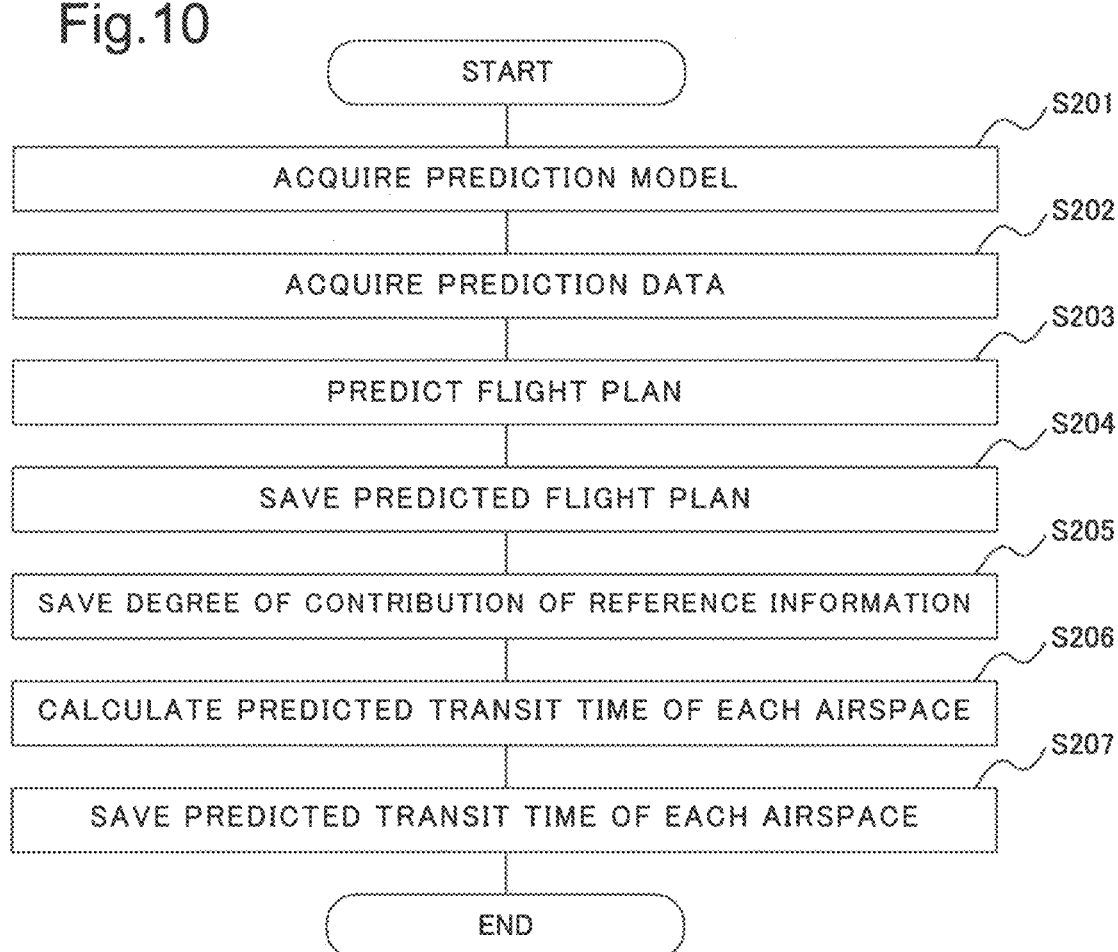
FIG. 10 is a flowchart illustrating prediction processing in the example embodiment.

FIG. 10 is a flowchart illustrating the prediction processing in the example embodiment.

The flight plan prediction unit 201 of the prediction unit 200 acquires a prediction model for a combination of a departure airport and a destination airport of each flight to be predicted from the prediction model storage unit 603 (Step S201).

For example, the prediction unit 200 acquires the prediction model in FIG. 9.

The flight plan prediction unit 201 acquires prediction data for each flight to be predicted from the prediction data storage unit 602 (Step S202).

For example, the prediction unit 200 acquires the prediction data in FIG. 11.

The flight plan prediction unit 201 predicts a flight plan for each flight to be predicted by applying the prediction data to the prediction model for the combination of the departure airport and the destination airport of the flight (Step S203).

Herein, the flight plan prediction unit 201 predicts the flight plan by applying a value of each attribute in the reference information included in the prediction data to an explanatory variable in the prediction model and calculating a value of an objective variable. Further, the flight plan prediction unit 201 performs preprocessing that is identical to the preprocessing on the learning data on the prediction data, and applies the preprocessed prediction data to the prediction model.

FIG. 12 is a diagram illustrating an example of preprocessing on prediction data in the example embodiment. In the example of FIG. 12, the preprocessing that is identical to the preprocessing on the learning data illustrated in FIG. 6 is performed on the prediction data.

Figure 13:
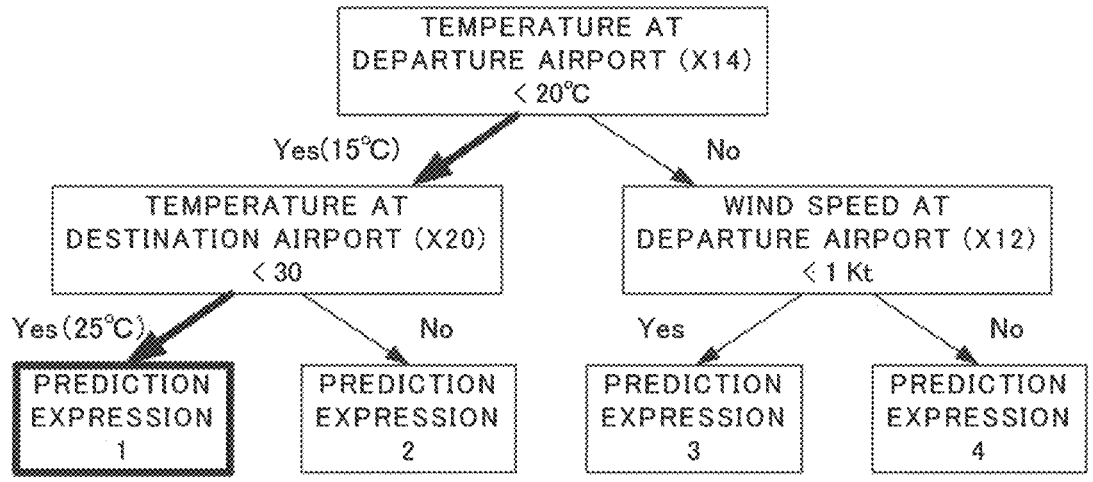
FIG. 13 is a diagram illustrating a prediction example of a flight plan in the example embodiment.

FIG. 13 is a diagram illustrating a prediction example of a flight plan in the example embodiment. FIG. 13 is the prediction example of a route included in the flight plan.

For example, the flight plan prediction unit 201 applies the preprocessed prediction data in FIG. 12 to the route prediction model in FIG. 7 for a flight having a flight ID "001" and a scheduled date of departure "2016/06/19". Herein, as in FIG. 13, the flight plan prediction unit 201 determines, as "prediction expression 1", a prediction expression for determining whether or not a route is "route AB1" by using the prediction expression determining tree. The flight plan prediction unit 201 predicts that the route is "route AB1" by using the prediction expression 1. Further, the flight plan prediction unit 201 predicts that a speed is "480 kt" by using the speed prediction model in FIG. 8. Similarly, the flight plan prediction unit 201 predicts that an altitude is "36000 feet" by using the altitude prediction model, which is not illustrated.

The flight plan prediction unit 201 saves the predicted flight plan acquired for each flight to be predicted in the prediction result storage unit 604 (Step S204).

Figure 14:
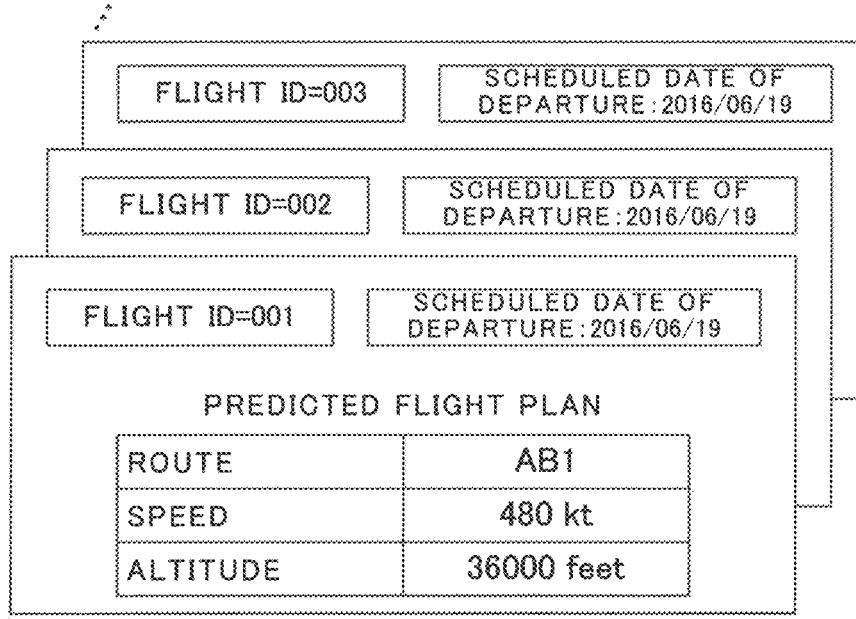
FIG. 14 is a diagram illustrating an example of a prediction flight plan stored in a prediction result storage unit 604 in the example embodiment.

FIG. 14 is a diagram illustrating an example of a prediction flight plan stored in the prediction result storage unit 604 in the example embodiment.

For example, as in FIG. 14, the flight plan prediction unit 201 saves the predicted flight plan generated for each flight to be predicted.

The flight plan prediction unit 201 saves, as a prediction evidence, a degree of contribution of each attribute in the reference information acquired in prediction of the flight plan in the prediction evidence storage unit 605 (Step S205).

Herein, the flight plan prediction unit 201 saves, for example, a value of a product of an explanatory variable Xi and a coefficient Ai in a prediction expression used for route prediction of the flight plan as a degree of contribution of an attribute associated with the explanatory variable Xi.

For example, the flight plan prediction unit 201 saves a product "7.7" of an explanatory variable X4 and a coefficient A4 in the prediction example of the route in FIG. 13 as a degree of contribution of an attribute "scheduled date of departure is on Sunday".

Figure 15:
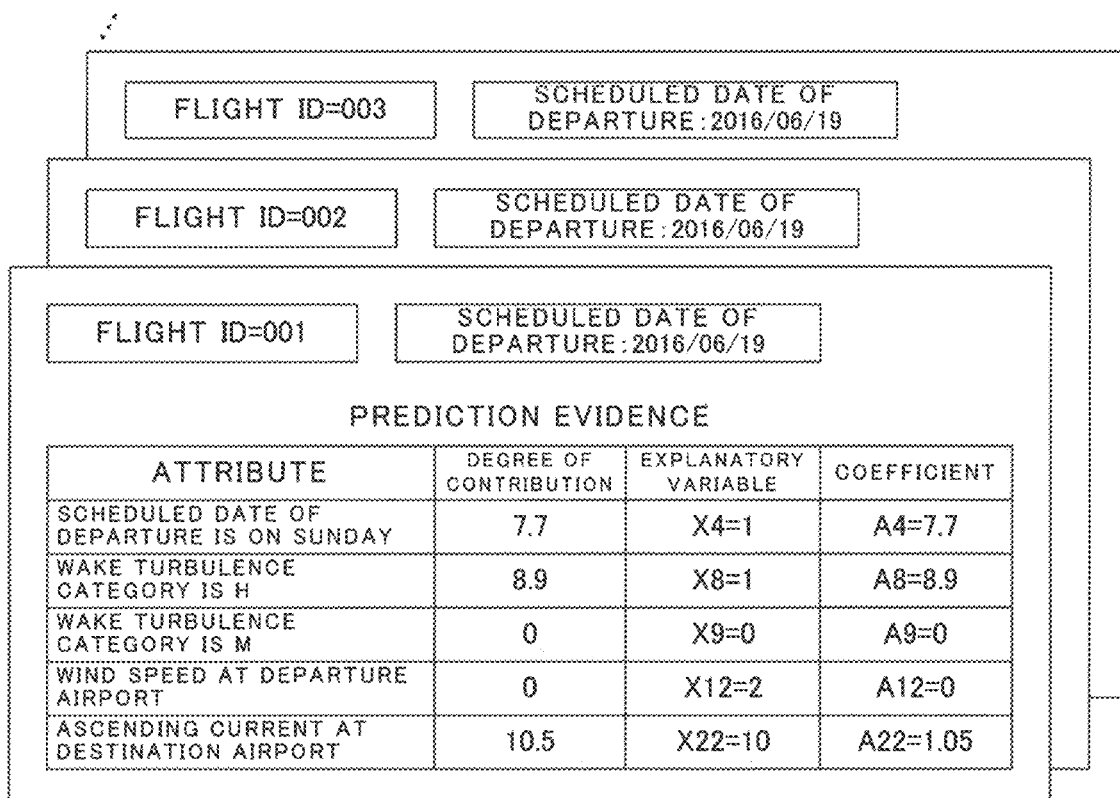
FIG. 15 is a diagram illustrating an example of a prediction evidence stored in a prediction evidence storage unit 605 in the example embodiment.

FIG. 15 is a diagram illustrating an example of a prediction evidence stored in the prediction evidence storage unit 605 in the example embodiment.

For example, as in FIG. 15, the flight plan prediction unit 201 saves, as prediction evidences, the degree of contribution of each attribute calculated for each flight to be predicted together with values of an explanatory variable and a coefficient.

Note that, as long as a degree of contribution of an attribute can be expressed, the flight plan prediction unit 201 may acquire the degree of contribution from, for example, a prediction expression used in speed prediction and altitude prediction. Further, the flight plan prediction unit 201 may use the coefficient Ai as a degree of contribution of an attribute associated with the explanatory variable Xi.

The transit time calculation unit 202 calculates a predicted transit time of each airspace for each flight to be predicted, based on the predicted flight plan (Step S206).

Herein, the transit time calculation unit 202 calculates a predicted transit time at a predetermined point within each airspace on the predicted route, based on a schedule of each flight and the predicted flight plan.

Figure 16:
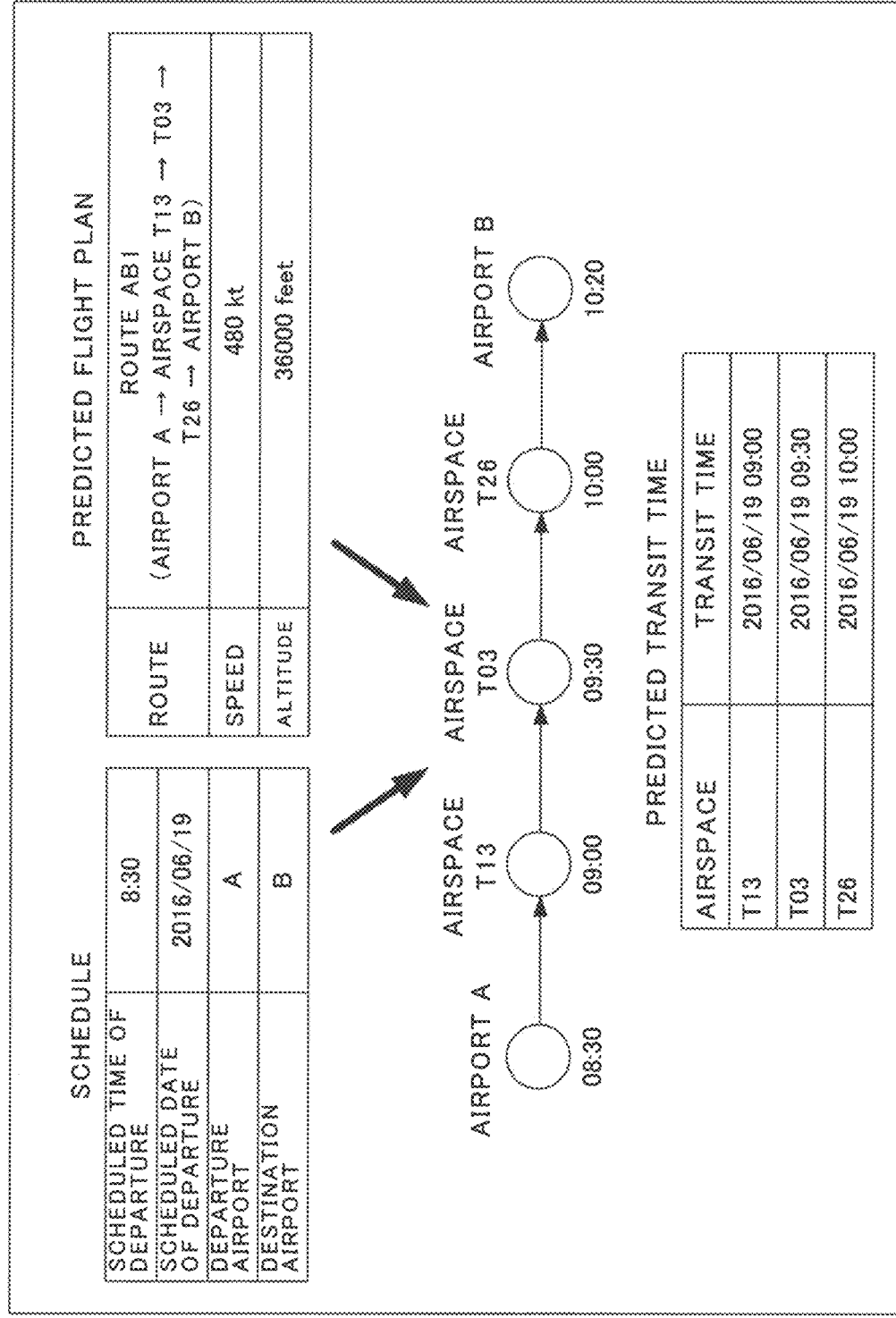
FIG. 16 is a diagram illustrating a calculation example of a predicted transit time in the example embodiment.

FIG. 16 is a diagram illustrating a calculation example of a predicted transit time in the example embodiment.

For example, as in FIG. 16, the flight plan prediction unit 201 calculates a predicted transit time of each airspace on the route "route AB1" for the flight having the flight ID "001" and the scheduled date of departure "2016/06/19" by using the speed "480 kt" and the altitude "36000 feet".

The flight plan prediction unit 201 saves the predicted transit time of each airspace acquired for each flight to be predicted in the transit time storage unit 606 (Step S207).

Figure 17:
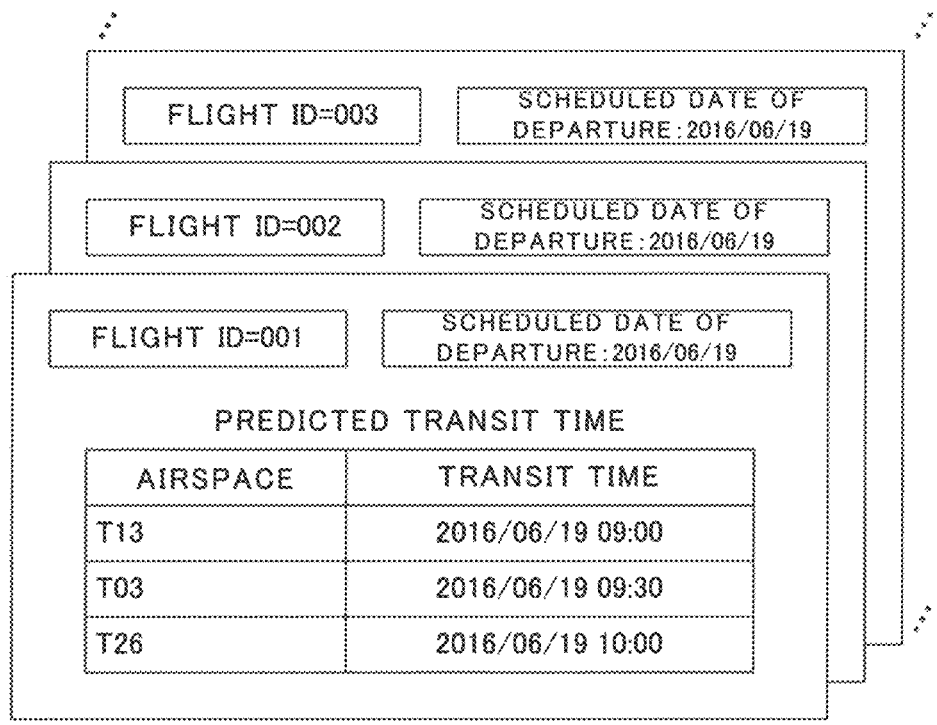
FIG. 17 is a diagram illustrating an example of a predicted transit time stored in a transit time storage unit 606 in the example embodiment.

FIG. 17 is a diagram illustrating an example of a predicted transit time stored in the transit time storage unit 606 in the example embodiment.

For example, as in FIG. 17, the flight plan prediction unit 201 saves the predicted transit time calculated for each flight to be predicted.

<<Prediction Result Displaying Processing>>

Next, processing of displaying a prediction result (prediction result displaying processing) is described.

<Display of Traffic Volume by Airspace Screen>

First, processing of displaying a screen indicating a predicted traffic volume in a specific time zone for each airspace (traffic volume by airspace screen) is described.

Figure 18:
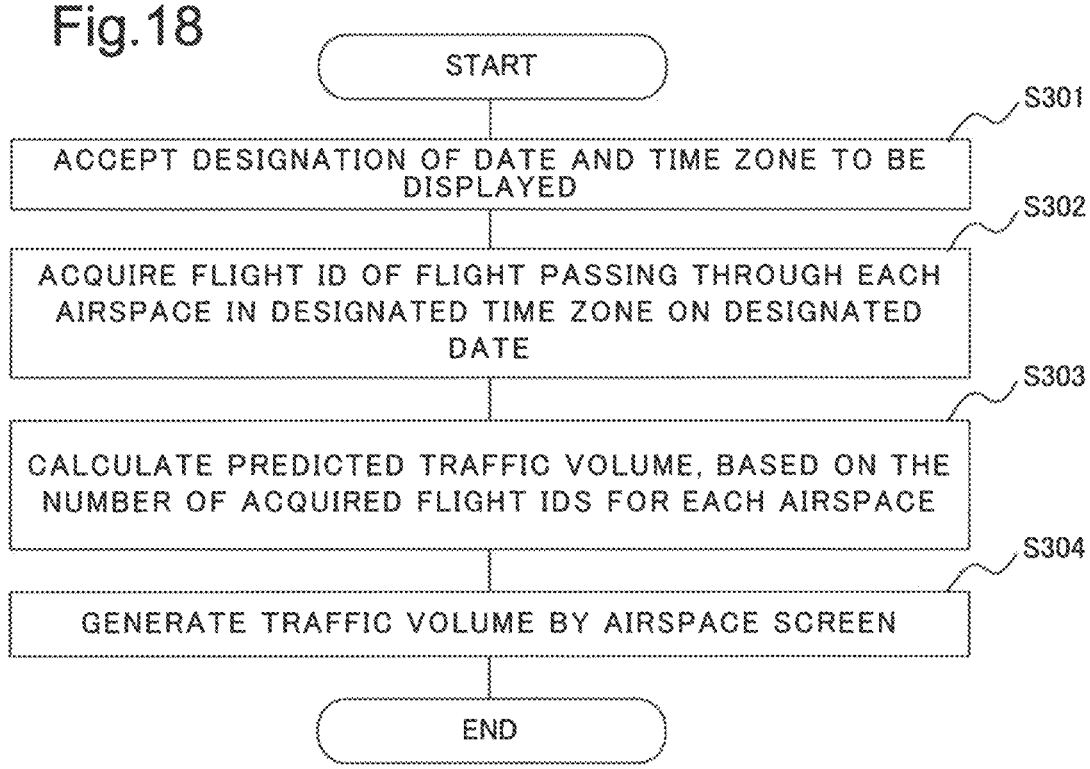
FIG. 18 is a flowchart illustrating processing of displaying a traffic volume by airspace screen in the example embodiment.

FIG. 18 is a flowchart illustrating the processing of displaying a traffic volume by airspace screen in the example embodiment.

The visualization processing unit 300 accepts designation of a date and a time zone for which a predicted traffic volume is to be displayed (Step S301). For example, the visualization processing unit 300 accepts designation of a date and a time zone to be displayed via the operation accepting unit 500 from a user.

The traffic volume calculation unit 301 of the visualization processing unit 300 refers to a predicted transit time of each airspace of each flight stored in the transit time storage unit 606, and acquires a flight ID of a flight that is predicted to pass through each airspace in the designated time zone on the designated date (Step S302).

The traffic volume calculation unit 301 calculates, by counting the number of acquired flight IDs for each airspace, a predicted traffic volume in the designated time zone on the designated date in the airspace (Step S303).

The display control unit 303 generates a traffic volume by airspace screen indicating a predicted traffic volume of each airspace, and causes the display device 4 to display the traffic volume by airspace screen (Step S304).

Figure 19:
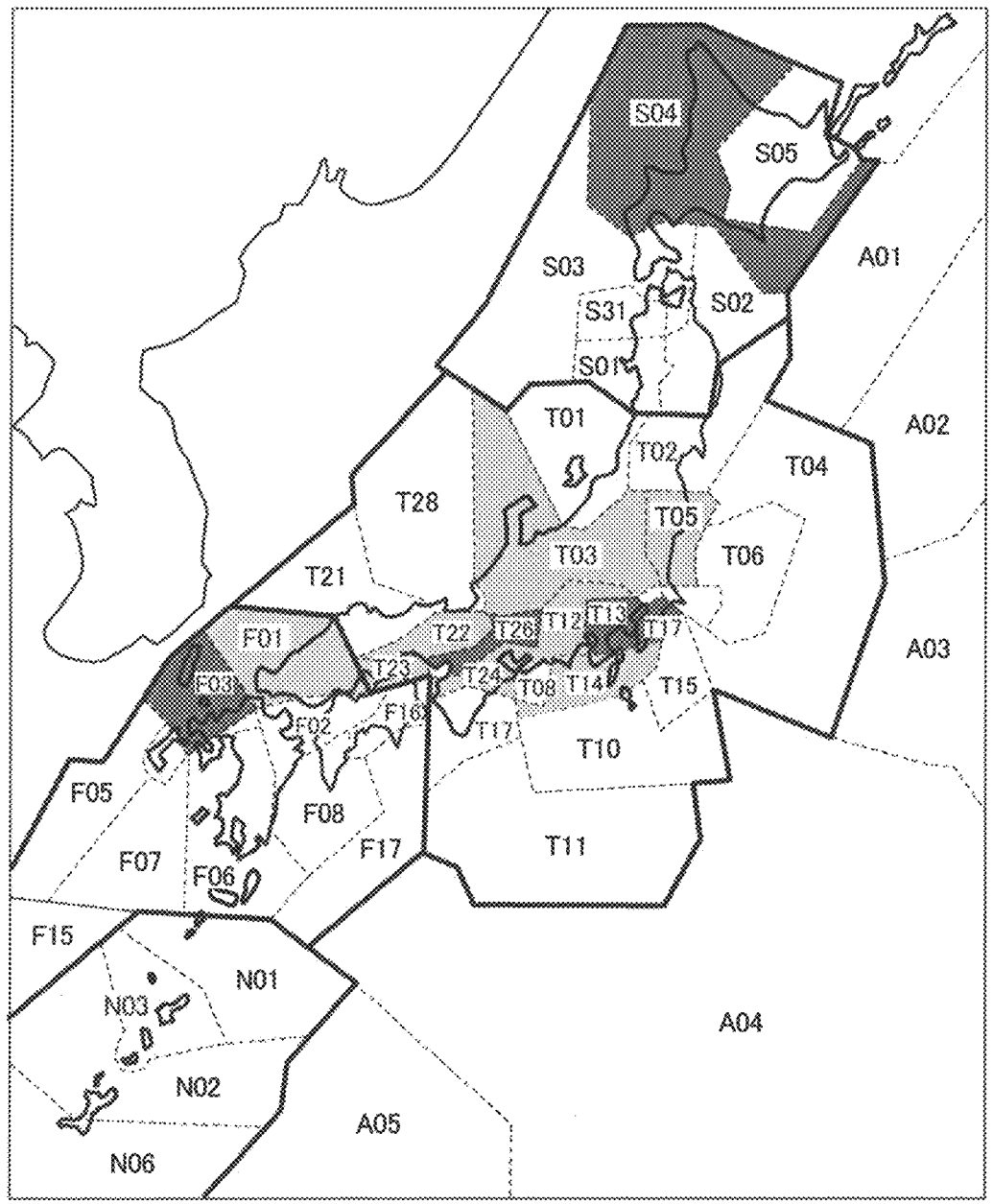
FIG. 19 is a diagram illustrating an example of a traffic volume by airspace screen in the example embodiment.

FIG. 19 is a diagram illustrating an example of a traffic volume by airspace screen in the example embodiment. In the traffic volume by airspace screen in FIG. 19, each region divided by a dotted line on a map represents an airspace. Each airspace is provided with an airspace ID ("T01", "T02", and the like). Further, for each airspace, for example, an airspace having a great predicted traffic volume is indicated by a dark color, and an airspace having a low predicted traffic volume is indicated by a light color according to a predicted traffic volume. Also, an airspace in which a predicted traffic volume exceeds an airspace capacity may be indicated by a specific color.

The traffic volume by airspace screen in FIG. 19 displays buttons for displaying a traffic volume by date screen, a traffic volume by time zone screen, a flight information screen, or a prediction evidence statistic (time zone) screen described later for a designated airspace, as a next screen.

A user can check a predicted traffic volume in a specific time zone for each airspace by the traffic volume by airspace screen as in FIG. 19, and further check information related to a transition of a predicted traffic volume and a flight for a specific airspace and a statistic of a prediction evidence by the next screen.

For example, the display control unit 303 generates the traffic volume by airspace screen as in FIG. 19 and causes the display device 4 to display the traffic volume by airspace screen.

<Display of Traffic Volume by Date Screen>

Next, processing of displaying a screen indicating a predicted traffic volume for each date in a specific airspace (traffic volume by date screen) is described.

Figure 20:
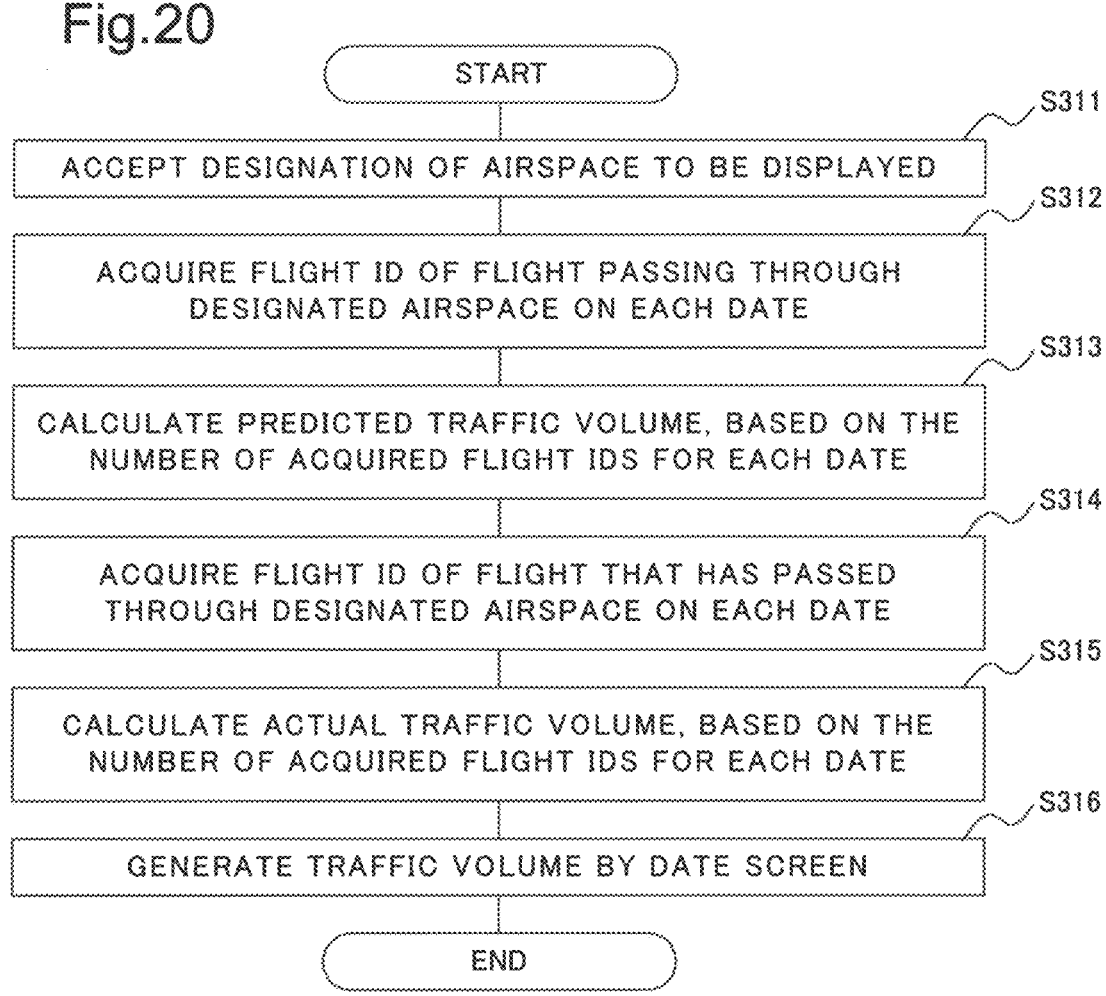
FIG. 20 is a flowchart illustrating processing of displaying a traffic volume by date screen in the example embodiment.

FIG. 20 is a flowchart illustrating the processing of displaying a traffic volume by date screen in the example embodiment.

The visualization processing unit 300 accepts designation of an airspace for which a predicted traffic volume is to be displayed (Step S311). For example, the visualization processing unit 300 may accept designation of an airspace via the operation accepting unit 500 during display of a predicted traffic volume in a designated time zone on a designated date on the above-mentioned traffic volume by airspace screen.

The traffic volume calculation unit 301 refers to a predicted transit time of the designated airspace of each flight stored in the transit time storage unit 606, and acquires a flight ID of a flight that is predicted to pass through the designated airspace on each date (Step S312).

The traffic volume calculation unit 301 calculates, by counting the number of acquired flight IDs for each date in Step 312, a predicted traffic volume in the designated airspace on the date (Step S313).

The traffic volume calculation unit 301 further acquires a flight ID of a flight that has passed through the designated airspace on each date, based on a past flight plan included in learning data stored in the learning data storage unit 601 (Step S314). Herein, the traffic volume calculation unit 301 calculates a transit time of each airspace by processing identical to that in Step S206 mentioned above, based on a route, a speed, and an altitude of the past flight plan, and acquires a flight ID of a flight that has passed through the designated airspace on each date.

The traffic volume calculation unit 301 counts the number of acquired flight IDs for each date in Step 314 as an actual traffic volume in the designated airspace on the date (Step S315).

The display control unit 303 generates a traffic volume by date screen indicating the predicted traffic volume and the actual traffic volume of each date, and causes the display device 4 to display the traffic volume by date screen (Step S316).

Figure 21:
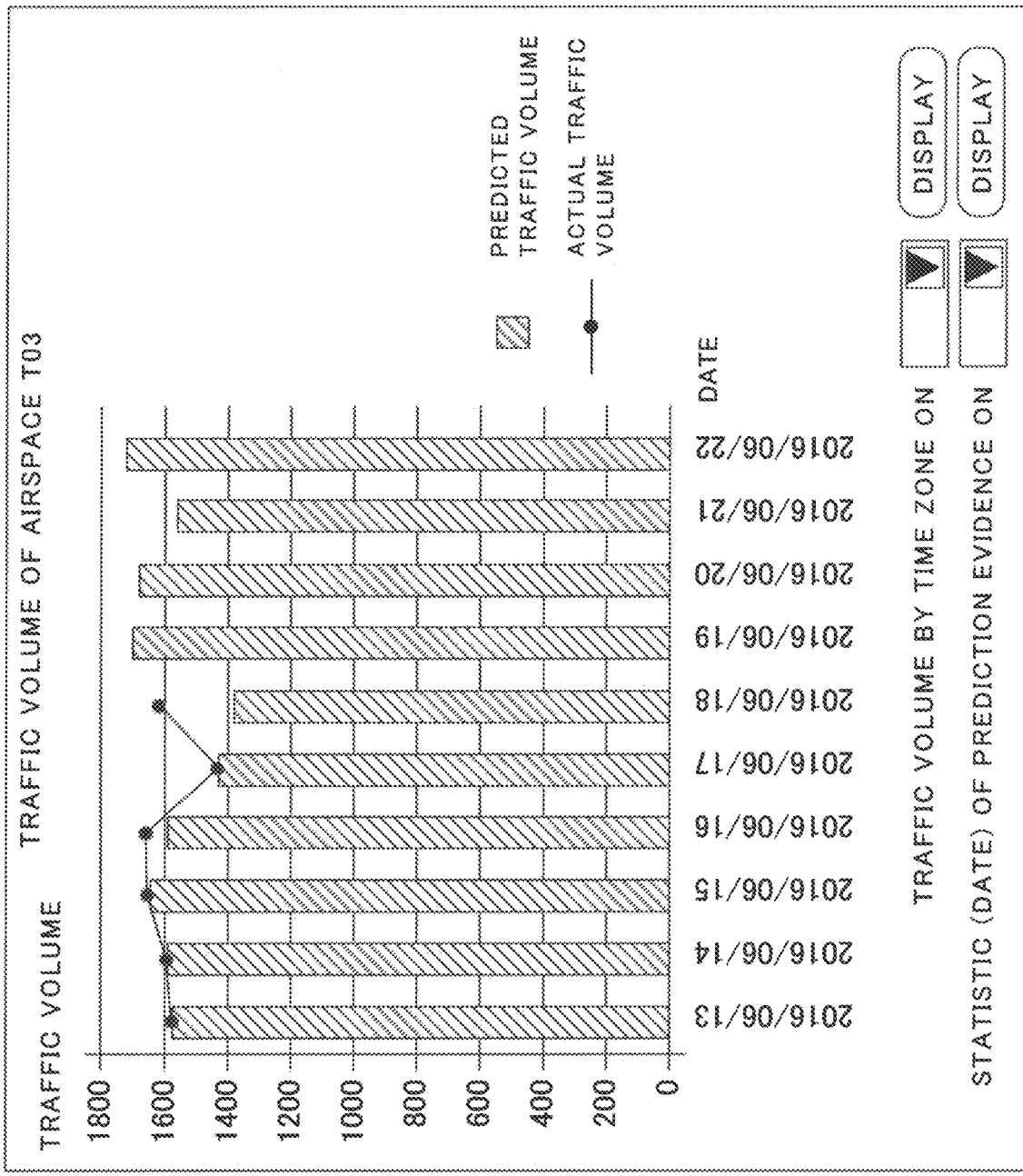
FIG. 21 is a diagram illustrating an example of a traffic volume by date screen in the example embodiment.

FIG. 21 is a diagram illustrating an example of a traffic volume by date screen in the example embodiment. The traffic volume by date screen in FIG. 21 indicates a predicted traffic volume of each date by a bar chart and an actual traffic volume of each past date by a line graph. Further, the traffic volume by date screen in FIG. 21 displays buttons for displaying a traffic volume by time zone screen or a prediction evidence statistic (date) screen described later for a designated date, as a next screen.

A user can check, for example, a divergence of a predicted traffic volume from an actual traffic volume for each date in a specific airspace by the traffic volume by date screen as in FIG. 21, and further check a transition of a predicted traffic volume and a statistic of a prediction evidence of a specific date by the next screen.

For example, the display control unit 303 generates the traffic volume by date screen as in FIG. 21 and causes the display device 4 to display the traffic volume by date screen.

<Display of Traffic Volume by Time Zone Screen>

Next, processing of displaying a screen indicating a predicted traffic volume for each time zone in a specific airspace (traffic volume by time zone screen) is described.

Figure 22:
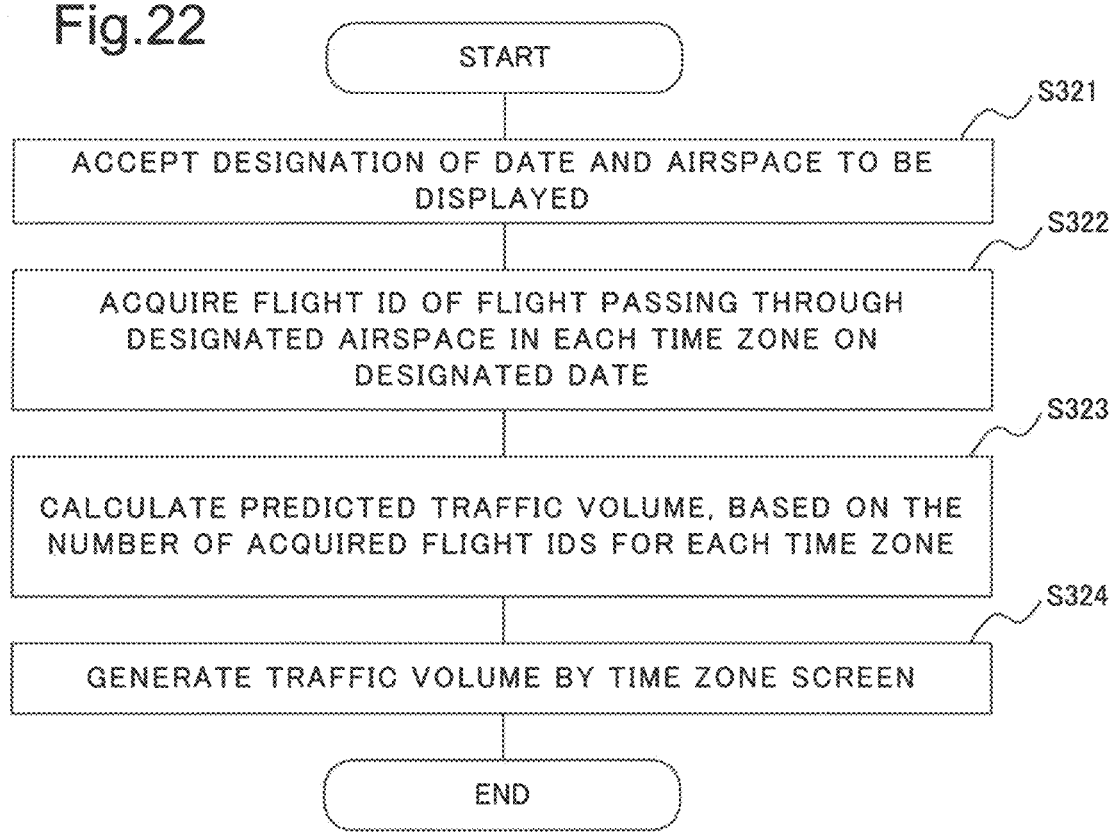
FIG. 22 is a flowchart illustrating processing of displaying a traffic volume by time zone screen in the example embodiment.

FIG. 22 is a flowchart illustrating the processing of displaying a traffic volume by time zone screen in the example embodiment.

The visualization processing unit 300 accepts designation of a date and an airspace for which a predicted traffic volume is to be displayed (Step S321). For example, the visualization processing unit 300 may accept designation of an airspace via the operation accepting unit 500 during display of a predicted traffic volume in a designated time zone on a designated date on the above-mentioned traffic volume by airspace screen.

The traffic volume calculation unit 301 refers to a predicted transit time of each airspace of each flight stored in the transit time storage unit 606, and acquires a flight ID of a flight that is predicted to pass through the designated airspace in each time zone on the designated date (Step S322).

The traffic volume calculation unit 301 calculates, by counting the number of acquired flight IDs for each time zone, a predicted traffic volume of the designated airspace in the time zone (Step S323).

The display control unit 303 generates a traffic volume by time zone screen indicating a predicted traffic volume in each time zone, and causes the display device 4 to display the traffic volume by time zone screen (Step S324).

Figure 23:
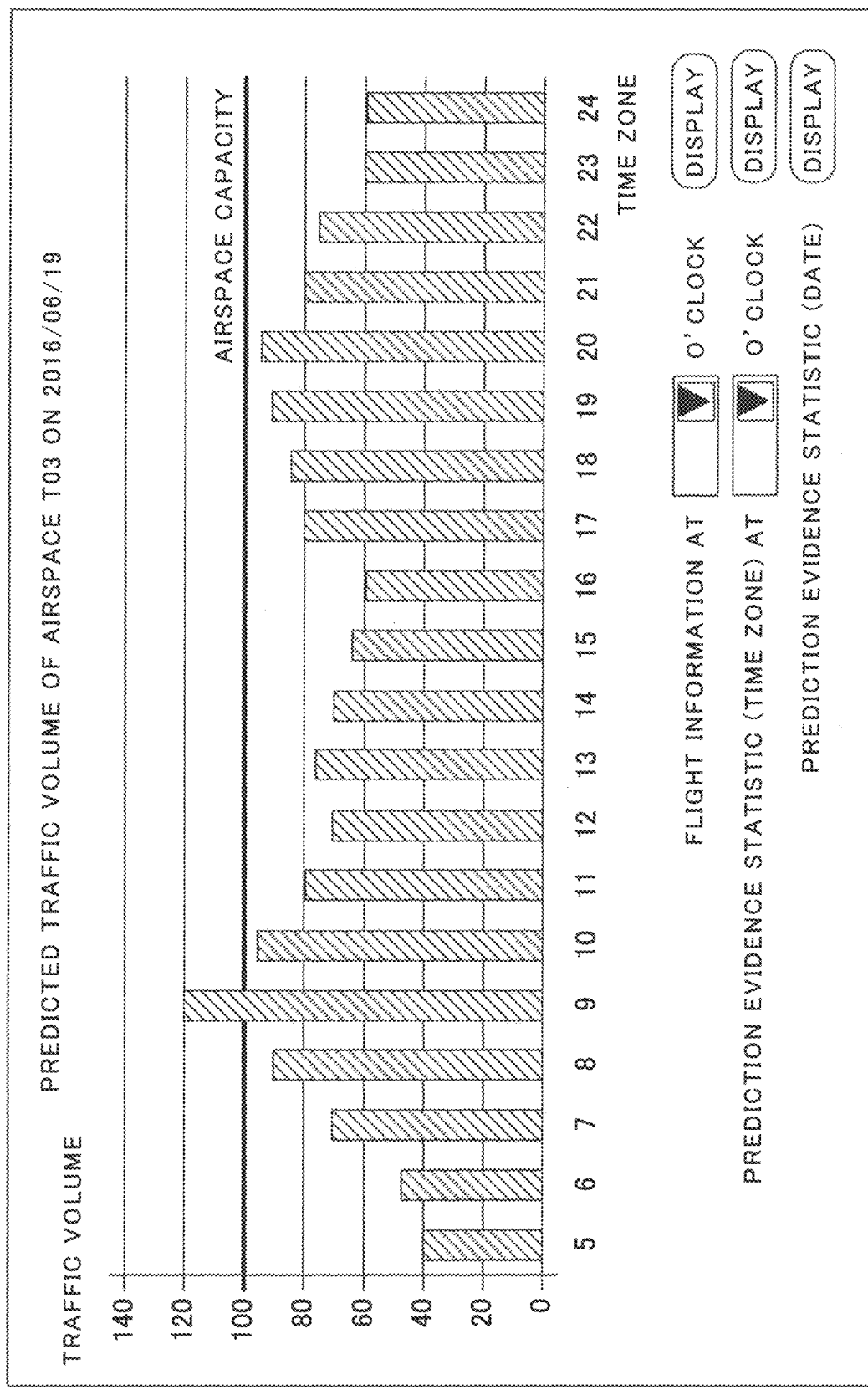
FIG. 23 is a diagram illustrating an example of a traffic volume by time zone screen in the example embodiment.

FIG. 23 is a diagram illustrating an example of a traffic volume by time zone screen in the example embodiment. The traffic volume by time zone screen in FIG. 23 indicates a predicted traffic volume in each time zone by a bar chart. Further, an airspace capacity is indicated by a thick line. Further, the traffic volume by time zone screen in FIG. 23 displays buttons for displaying a flight information screen described later for a designated time zone, as a next screen. Furthermore, the traffic volume by time zone screen also displays buttons for displaying a prediction evidence statistic (time zone) screen described later for a designated time zone, and a button for displaying a prediction evidence statistic (date) screen described later.

A user can check, for example, a predicted traffic volume in each time zone of a specific airspace by the traffic volume by time zone screen as in FIG. 23, and further check details of a flight in a specific time zone and a statistic of a prediction evidence of a specific time zone and a specific date by the next screen.

For example, the display control unit 303 generates the traffic volume by time zone screen as in FIG. 23 and causes the display device 4 to display the traffic volume by time zone screen.

<Display of Flight Information Screen>

Next, processing of displaying a screen indicating information about a flight in a specific time zone in a specific airspace (flight information screen) is described.

Figure 24:
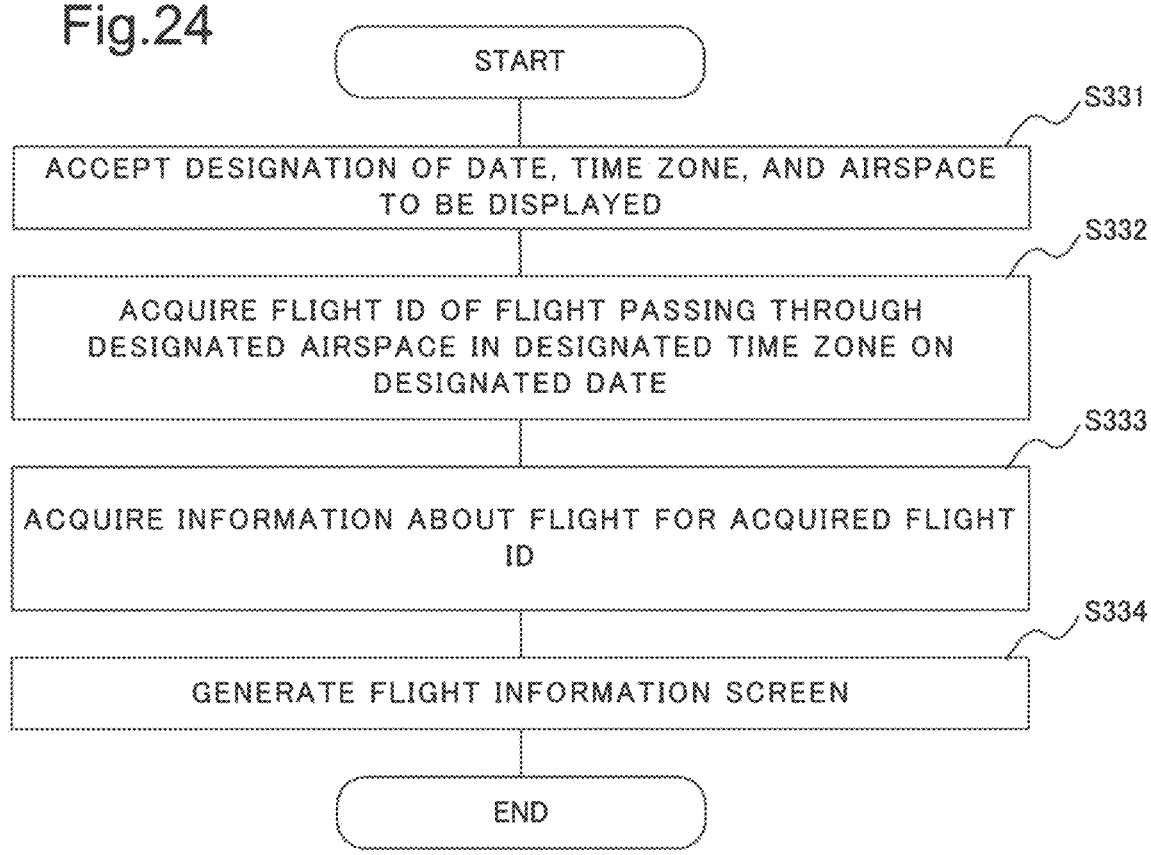
FIG. 24 is a flowchart illustrating processing of displaying a flight information screen in the example embodiment.

FIG. 24 is a flowchart illustrating the processing of displaying a flight information screen in the example embodiment.

The visualization processing unit 300 accepts designation of a date, a time zone, and an airspace for which information about a flight is to be displayed (Step S331). For example, the visualization processing unit 300 may accept designation of an airspace via the operation accepting unit 500 during display of a predicted traffic volume in a designated time zone on a designated date for each airspace on the above-mentioned traffic volume by airspace screen. Further, the visualization processing unit 300 may accept designation of a time zone during display of a predicted traffic volume on a designated date in a designated airspace on the above-mentioned traffic volume by time zone screen.

The display control unit 303 refers to a predicted transit time of each airspace of each flight stored in the transit time storage unit 606, and acquires a flight ID of a flight that is predicted to pass through the designated airspace in the designated time zone on the designated date (Step S332).

The display control unit 303 acquires information about the flight for the acquired flight ID (Step S333). Herein, for example, the display control unit 303 may acquire, as information about the flight, information about a schedule of the flight by referring to prediction data stored in the prediction data storage unit 602. Furthermore, the display control unit 303 may also acquire a predicted flight plan of the flight stored in the prediction result storage unit 604.

The display control unit 303 generates a flight information screen indicating the acquired information about the flight, and causes the display device 4 to display the flight information screen (Step S334).

FIG. 25 is a diagram illustrating an example of a flight information screen in the example embodiment. The flight information screen in FIG. 25 displays a schedule (departure airport, departure time, destination airport, and arrival time) and a predicted flight plan (route, speed, and altitude) of each flight.

Further, the flight information screen in FIG. 25 displays buttons for displaying a prediction evidence screen described later for a designated flight ID, and a button for displaying a prediction evidence statistic (time zone) screen described later, as a next screen.

A user can check, for example, information about each flight in a specific time zone by the flight information screen as in FIG. 25, and further check a prediction evidence of a specific flight and a statistic of a prediction evidence of a specific time zone by the next screen.

For example, the display control unit 303 generates the flight information screen as in FIG. 25 and causes the display device 4 to display the flight information screen.

Note that, the display control unit 303 may further acquire other information about a flight, such as a predicted transit time of each airspace of a flight, stored in the data storage unit 600 and display the information on the flight information screen.

<Display of Prediction Evidence Statistic (Date) Screen>

Next, processing of displaying a screen indicating a statistic of a prediction evidence of a specific date (prediction evidence statistic (date) screen) is described.

FIG. 26 is a flowchart illustrating the processing of displaying a prediction evidence statistic (date) screen in the example embodiment.

The visualization processing unit 300 accepts designation of a date and an airspace for which a statistic is to be displayed (Step S341). For example, the visualization processing unit 300 may perform the following processing during display of a predicted traffic volume on a designated date in a designated airspace on the above-mentioned traffic volume by time zone screen.

The statistic calculation unit 302 refers to a predicted transit time of each airspace of each flight stored in the transit time storage unit 606, and acquires a flight ID of a flight that is predicted to pass through the designated airspace on the designated date (Step S342).

The statistic calculation unit 302 acquires a prediction evidence of a flight plan of each of the acquired flight IDs from the prediction evidence storage unit 605 (Step S343).

The statistic calculation unit 302 calculates a statistic of the acquired prediction evidence (Step S344). Herein, the statistic calculation unit 302 calculates an average value, a maximum value, and a minimum value of a degree of contribution for each attribute in the reference information.

The display control unit 303 generates a prediction evidence statistic (date) screen indicating a statistic of a prediction evidence, and causes the display device 4 to display the prediction evidence statistic (date) screen (Step S345).

FIG. 27 is a diagram illustrating an example of a prediction evidence statistic (date) screen in the example embodiment. The prediction evidence statistic (date) screen in FIG. 27 displays an average value, a maximum value, and a minimum value of a degree of contribution of each attribute as a statistic of a prediction evidence.

Further, the prediction evidence statistic (date) screen in FIG. 27 displays buttons for displaying, a prediction evidence screen described later for a flight ID associated with a designated maximum value or the minimum value, as a next screen.

A user can check a prediction evidence of a predicted flight plan of a specific date by the prediction evidence statistic (date) screen as in FIG. 27, and further check details of a prediction evidence of a flight in which a degree of contribution indicates a specific value such as a maximum value and a minimum value by the next screen.

For example, the display control unit 303 generates the prediction evidence statistic (date) screen as in FIG. 27 and causes the display device 4 to display the prediction evidence statistic (date) screen.

Note that, the display control unit 303 may display a graph indicating a distribution of degrees of contribution of each attribute on the prediction evidence statistic (date) screen. In this case, the display control unit 303 may display a button for displaying a prediction evidence screen described later for a flight ID associated with a specific degree of contribution on the distribution graph. In this way, details of a prediction evidence of a flight in which a degree of contribution indicates a value greatly different from that of another flight can be checked.

<Display of Prediction Evidence Statistic (Time Zone) Screen>

Next, processing of displaying a screen indicating a statistic of a prediction evidence of a specific time zone (prediction evidence statistic (time zone) screen) is described.

FIG. 28 is a flowchart illustrating the processing of displaying a prediction evidence statistic (time zone) screen in the example embodiment.

The visualization processing unit 300 accepts designation of a date, a time zone, and an airspace for which a statistic is to be displayed (Step S351). For example, the visualization processing unit 300 may accept designation of an airspace via the operation accepting unit 500 during display of a predicted traffic volume in a designated time zone on a designated date for each airspace on the above-mentioned traffic volume by airspace screen. Further, the visualization processing unit 300 may accept designation of a time zone during display of a predicted traffic volume on a designated date in a designated airspace on the above-mentioned traffic volume by time zone screen. Furthermore, the visualization processing unit 300 may perform the following processing during display of information about a flight in a designated time zone on a designated date in a designated airspace on the above-mentioned flight information screen.

The statistic calculation unit 302 refers to a predicted transit time of each airspace of each flight stored in the transit time storage unit 606, and acquires a flight ID of a flight that is predicted to pass through the designated airspace in the designated time zone on the designated date (Step S352).

The statistic calculation unit 302 acquires a prediction evidence of a flight plan of each of the acquired flight IDs from the prediction evidence storage unit 605 (Step S353).

The statistic calculation unit 302 calculates a statistic of the acquired prediction evidence (Step S354). Herein, the statistic calculation unit 302 calculates an average value, a maximum value, and a minimum value of a degree of contribution for each attribute in the reference information.

The display control unit 303 generates a prediction evidence statistic (time zone) screen indicating a statistic of a prediction evidence, and causes the display device 4 to display the prediction evidence statistic (time zone) screen (Step S355).

FIG. 29 is a diagram illustrating an example of a prediction evidence statistic (time zone) screen in the example embodiment. The prediction evidence statistic (time zone) screen in FIG. 29 displays an average value, a maximum value, and a minimum value of a degree of contribution of each attribute as a statistic of a prediction evidence.

Further, the prediction evidence statistic (time zone) screen in FIG. 29 displays buttons for displaying a prediction evidence screen described later for a flight ID associated with a designated maximum value or the minimum value, as a next screen.

A user can check a prediction evidence of a predicted flight plan of a specific date and a specific time zone by the prediction evidence statistic (date) screen as in FIG. 29, and further check details of a prediction evidence of a flight in which a degree of contribution indicates a specific value such as a maximum value and a minimum value by the next screen.

For example, the display control unit 303 generates the prediction evidence statistic (time zone) screen as in FIG. 29 and causes the display device 4 to display the prediction evidence statistic (time zone) screen.

Note that, the display control unit 303 may display a graph indicating a distribution of degrees of contribution of each attribute on the prediction evidence statistic (time zone) screen, similarly to the prediction evidence statistic (date) screen.

<Display of Prediction Evidence Screen>

Next, processing of displaying a screen indicating a prediction evidence concerned with a specific flight (prediction evidence screen) is described.

FIG. 30 is a flowchart illustrating the processing of displaying a prediction evidence screen in the example embodiment.

The visualization processing unit 300 accepts designation of a flight ID for which a prediction evidence is to be displayed (Step S361). The visualization processing unit 300 may accept designation of a flight ID via the operation accepting unit 500 during display of information about each flight on the above-mentioned flight information screen. Further, the visualization processing unit 300 may accept designation of a statistic during display of a statistic of a prediction evidence on the prediction evidence statistic (time zone) screen or the prediction evidence statistic (date) screen mentioned above, and perform the following processing on a flight ID associated with the statistic.

The display control unit unit 303 acquires a prediction evidence of a flight plan of the designated flight ID stored in the prediction evidence storage unit 605 (Step S362). Further, the display control unit 303 may acquire a predicted flight plan of the designated flight ID stored in the prediction result storage unit 604.

The display control unit 303 generates a prediction evidence display screen indicating the acquired prediction evidence, and causes the display device 4 to display the prediction evidence display screen (Step S363).

FIG. 31 is a diagram illustrating an example of a prediction evidence screen in the example embodiment. The prediction evidence screen in FIG. 31 displays a predicted flight plan (route, speed, and altitude) of a flight and prediction evidences (degree of contribution, explanatory variable, and coefficient, for each attribute).

A user can check a predicted flight plan of a specific flight and prediction evidences thereof by the prediction evidence screen as in FIG. 31.

For example, the display control unit 303 generates the prediction evidence screen as in FIG. 31 and causes the display device 4 to display the prediction evidence screen.

As described above, the operation in the example embodiment is completed.

Figure 1:
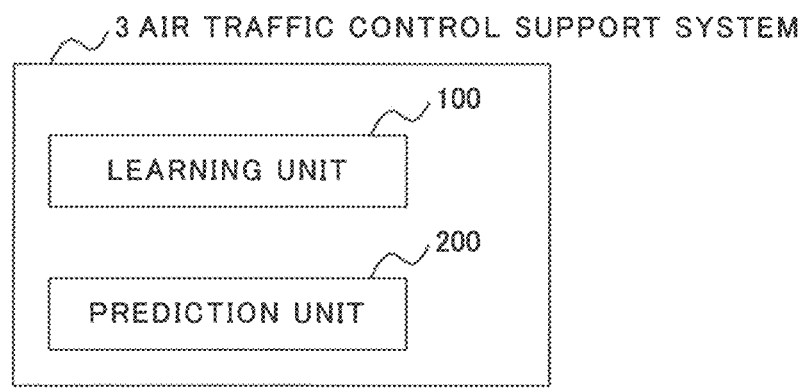
FIG. 1 is a block diagram illustrating a characteristic configuration of an example embodiment.

Next, a characteristic configuration of the example embodiment is described. FIG. 1 is a block diagram illustrating the characteristic configuration of the example embodiment.

With reference to FIG. 1, the air traffic control support system 3 includes the learning unit 100 and the prediction unit 200. The learning unit 100 generates a prediction model, based on learning data including a past flight plan and information that affected formulation of the past flight plan. The prediction unit 200 predicts a flight plan, based on information that affects formulation of the flight plan and a prediction model.

Next, an advantageous effect of the example embodiment is described.

According to the above-mentioned example embodiment, a flight plan can be more quickly grasped in air traffic control. The reason is described as follows. The air traffic control support system 3 generates a prediction model, based on learning data including a past flight plan and information that affected formulation of the past flight plan. Then, the air traffic control support system 3 predicts a flight plan, based on information that affects formulation of the flight plan and a prediction model. In this way, traffic flow control based on the flight plan can be more quickly executed, and a frequency of the traffic flow control can be reduced. Then, a delay time of a flight can be reduced, and a load on a controller and the like can be reduced.

Further, according to the above-mentioned example embodiment, a controller and the like can grasp a prediction evidence of a flight plan in air traffic control. The reason is that the air traffic control support system 3 displays a prediction result of a flight plan and a degree of contribution indicating a degree that information affecting formulation of the flight plan affects the prediction result. In this way, the controller and the like can determine whether or not the prediction result of the flight plan is reliable (convincing) with the prediction evidence and controller's experience and the like. Further, a new realization of a factor affecting the prediction result of the flight plan can be given to the controller and the like.

Further, according to the above-mentioned example embodiment, a traffic volume can be more quickly grasped in air traffic control. The reason is that the air traffic control support system 3 calculates a predicted traffic volume that is a prediction value of a planned traffic volume, for a certain airspace in a certain time zone, based on prediction results of a plurality of flight plans, and displays the predicted traffic volume.

While the present invention has been particularly shown and described with reference to the example embodiments thereof, the present invention is not limited to the embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2016-160728, filed on Aug. 18, 2016, the disclosure of which is incorporated herein in its entirety by reference.

REFERENCE SIGNS LIST

1 Control information processing system
2 Data management device
3 Air traffic control support system
4 Display device
11 CPU
12 Storage device
13 Input-output device
14 Communication device
100 Learning unit
200 Prediction unit
201 Flight plan prediction unit
202 Transit time calculation unit
300 Visualization processing unit
301 Traffic volume calculation unit
302 Statistic calculation unit
303 Display control unit
400 Data acquisition unit
500 Operation accepting unit
600 Data storage unit
601 Learning data storage unit
602 Prediction data storage unit
603 Prediction model storage unit
604 Prediction result storage unit
605 Prediction evidence storage unit
606 Transit time storage unit

What is claimed is:

1. An air traffic control support system comprising:
a memory storing instructions; and
one or more processors configured to execute the instructions to:
generate a prediction model, based on learning data including a past flight plan and information that affected formulation of the past flight plan; and
predict a flight plan, based on information affecting formulation of the flight plan and the prediction model;
cause display means to display a prediction result of the flight plan and a degree of contribution indicating a degree that information affecting formulation of the flight plan affects the prediction result;
calculate a predicted traffic volume being a prediction value of a planned traffic volume for an airspace in a time zone, based on prediction results of a plurality of the flight plans; and
cause the display means to display the predicted traffic volume,
wherein the airspace comprises a space above a subarea in a plurality of subareas into which an area is divided.

2. The air traffic control support system according to claim 1, wherein the one or more processors are further configured to execute the instructions to:
cause the display means to display the predicted traffic volume for each time zone and each airspace;
accept an operation of designating a time zone and an airspace; and
cause the display means to display a prediction result of the flight plan specified based on the designated time zone and airspace, and the degree of contribution to the prediction result.

3. The air traffic control support system according to claim 1, wherein the one or more processors are further configured to execute the instructions to:
cause the display means to display the predicted traffic volume for each time zone and each airspace;
accept an operation of designating a time zone and an airspace;
calculate, based on prediction results of a plurality of the flight plans specified based on the designated time zone and airspace, a statistic of the degree of contribution to prediction results of the plurality of the flight plans; and
cause the display means to display a statistic of the degree of contribution.

4. The air traffic control support system according to claim 3, wherein the one or more processors are further configured to execute the instructions to:
accept an operation of designating a statistic; and
cause the display means to display a prediction result of the flight plan specified based on the designated statistic, and the degree of contribution to the prediction result.

5. An air traffic control support method comprising:
generating a prediction model, based on learning data including a past flight plan and information that affected formulation of the past flight plan; and
predicting a flight plan, based on information affecting formulation of the flight plan and the prediction model;
causing display means to display a prediction result of the flight plan and a degree of contribution indicating a degree that information affecting formulation of the flight plan affects the prediction result;
calculating a predicted traffic volume being a prediction value of a planned traffic volume for an airspace in a time zone, based on prediction results of a plurality of the flight plans; and
causing the display means to display the predicted traffic volume,
wherein the airspace comprises a space above a subarea in a plurality of subareas into which an area is divided.

6. A non-transitory computer readable recording medium recording thereon a program causing a computer to perform a method comprising:

generating a prediction model, based on learning data including a past flight plan and information that affected formulation of the past flight plan; and predicting a flight plan, based on information affecting formulation of the flight plan and the prediction model;

causing display means to display a prediction result of the flight plan and a degree of contribution indicating a degree that information affecting formulation of the flight plan affects the prediction result;

calculating a predicted traffic volume being a prediction value of a planned traffic volume for an airspace in a time zone, based on prediction results of a plurality of the flight plans; and causing the display means to display the predicted traffic volume, wherein the airspace comprises a space above a subarea in a plurality of subareas into which an area is divided.

* * * * *